United States Patent
Kumar et al.

(10) Patent No.: US 7,515,972 B2
(45) Date of Patent: Apr. 7, 2009

(54) SYSTEM AND METHOD FOR DYNAMICALLY CREATING AND EDITING FUNCTION BLOCK TYPES IN A PROCESS CONTROL ENVIRONMENT

(75) Inventors: Ravi R. Kumar, Bangalore (IN); Mohamed F. M. Saleem Jahaber, Bangalore (IN); Cathleen F. Kilpatrick, Perkasie, PA (US)

(73) Assignee: Honeywell International Inc., Morristown, NJ (US)

( * ) Notice: Subject to any disclaimer, the term of this patent is extended or adjusted under 35 U.S.C. 154(b) by 119 days.

(21) Appl. No.: 11/261,015

(22) Filed: Oct. 28, 2005

(65) Prior Publication Data

US 2007/0100471 A1 May 3, 2007

(51) Int. Cl.
*G05B 11/01* (2006.01)
*G05B 15/00* (2006.01)
(52) U.S. Cl. .......................................... 700/17; 700/83
(58) Field of Classification Search .................... 700/17, 700/83
See application file for complete search history.

(56) References Cited

U.S. PATENT DOCUMENTS

| | | | |
|---|---|---|---|
| 5,971,581 A * | 10/1999 | Gretta et al. ................. | 700/83 |
| 5,974,257 A * | 10/1999 | Austin ........................ | 717/125 |
| 6,036,366 A | 3/2000 | Andreasson | |
| 6,195,591 B1 | 2/2001 | Nixon et al. | |
| 6,425,120 B1 * | 7/2002 | Morganelli et al. ......... | 717/109 |
| 6,449,624 B1 | 9/2002 | Hammack et al. | |
| 6,718,533 B1 * | 4/2004 | Schneider et al. ........... | 717/100 |
| 7,089,530 B1 * | 8/2006 | Dardinski et al. ........... | 717/105 |
| 2003/0195639 A1 | 10/2003 | Nixon et al. | |

OTHER PUBLICATIONS

Mastering Simulink; by James B Dabney and Thomas L. Harman; copyright 2004; applicable pages (pp. 34-35, pp. 43-47, pp. 146-161, p. 91, pp. 102-103, p. 138, p. 144, p. 142 and Chapter 4,).*
Mastering Simulink; by James B Dabney and Thomas L. Harman; pp. 5, 32-33, 36-42, 48 and 330-361.*

* cited by examiner

*Primary Examiner*—Ronald D Hartman, Jr.
(74) *Attorney, Agent, or Firm*—Munck Carter P.C.

(57) ABSTRACT

An apparatus includes a memory capable of storing information defining multiple function block types. A combination of instances of one or more function block types is capable of implementing a control process in a controller within a process control system. The apparatus also includes a function block editor capable of allowing a user to dynamically create or modify one or more of the function block types using a graphical user interface. The function block editor is capable of allowing the user to define one or more parameters for a function block type being created or modified.

18 Claims, 18 Drawing Sheets

| | Parameter name | Parameter description | First dimension array size | Data type | Minimum value | Minimum value reference | Maximum value |
|---|---|---|---|---|---|---|---|
| 1 | ST_REV | Static Revision Number 1 | 0 | UINT16 | | | |
| 2 | TAG_DESC | Block Tag Description | 0 | STRING | | | |
| 3 | STRATEGY | Strategy ID (Not Used) | 0 | UINT16 | | | |
| 4 | ALERT_KEY | Alert Key (Not Used) | 0 | UINT8 | | | 255 |
| 5 | MODE | Block Mode | 0 | ENUM | | | |
| 6 | MODE.TARGET | Target Mode | 0 | ENUM | | | |
| 7 | MODE.ACTUAL | Actual Mode | 0 | ENUM | | | |
| 8 | MODE.PERMITTED | Permitted Mode | 0 | BITSTRING | | | |
| 9 | MODE.NORMAL | Normal Mode | 0 | ENUM | | | |
| 10 | BLOCK_ERR | Block Errors (Blk Alarm) | 0 | BITSTRING | | | |
| 11 | PV | Process Variable | 0 | STRUCTDAT | | | |
| 12 | PV.STATUS | Status | 0 | ENUM | | | |
| 13 | PV.VALUE | Process Variable | 0 | FLOAT32 | | | |
| 14 | OUT | Output | 0 | STRUCTDAT | | | |
| 15 | OUT.STATUS | Status | 0 | ENUM | | | |
| 16 | OUT.VALUE | Output | 0 | FLOAT32 | | OUT_SCALE.EU_0 | |
| 17 | SIMULATE | Simulation Control | 0 | STRUCTDAT | | | |
| 18 | SIMULATE.SIMULATE_STATUS | Simulate Status | 0 | ENUM | | | |
| 19 | SIMULATE.SIMULATE_VALUE | Simulate Value | 0 | FLOAT32 | | | |
| 20 | SIMULATE.TRANSDUCER_STATUS | Transducer Status | 0 | ENUM | | | |
| 21 | SIMULATE.TRANSDUCER_VALUE | Transducer Value | 0 | FLOAT32 | | | |
| 22 | SIMULATE.ENABLE_DISABLE | Simulate En/Disable | 0 | ENUM | | | |
| 23 | XD_SCALE.EU_100 | EU at 100% | 0 | FLOAT32 | | | |
| 24 | XD_SCALE.EU_0 | EU at 0% | 0 | FLOAT32 | | | |
| 25 | XD_SCALE.DECIMAL | Decimal | 0 | INT8 | | | |
| 26 | OUT_SCALE | Output Scales & Units | 0 | STRUCTDAT | | | |
| 27 | OUT_SCALE.EU_100 | EU at 100% | 0 | FLOAT32 | | | |
| 28 | OUT_SCALE.EU_0 | EU at 0% | 0 | FLOAT32 | | | |
| 29 | OUT_SCALE.UNITS_INDEX | Units Index | 0 | ENUM | | | |
| 30 | OUT_SCALE.DECIMAL | Decimal | 0 | INT8 | | | |
| 31 | GRANT_DENY | Grant Control to Others | 0 | STRUCTDAT | | | |
| 32 | GRANT_DENY.GRANT | Grant | 0 | BITSTRING | | | |
| 33 | GRANT_DENY.GRANT.OPER | Grant operate | 0 | BOOL | | | |
| 34 | GRANT_DENY.GRANT.TUNE | Grant tune | 0 | BOOL | | | |
| 35 | GRANT_DENY.GRANT.ALARM | Grant alarm | 0 | BOOL | | | |

FIGURE 5B

| | Parameter name | Parameter description | First dimension array size | Data type | Minimum value | Minimum value reference | Maximum value | Maximum |
|---|---|---|---|---|---|---|---|---|
| 1 | XD_SCALE | Transducer Scaling | 0 | STRUCTDAT | | | | |
| 2 | XD_SCALE.UNITS_INDEX | Units Index | 0 | ENUM | | | | |
| 3 | IO_OPTS | Input/Output Options | 0 | BITSTRING | | | | |
| 4 | STATUS_OPTS | Status Options | 0 | BITSTRING | | | | |
| 5 | CHANNEL | Transducer Channel No. | 0 | UINT16 | 1 | | 2 | |
| 6 | PV_FTIME | PV Filter Time Constant | 0 | FLOAT32 | 0 | | 200 | |
| 7 | AUX_VAR1 | AUX_VAR1 | 0 | FLOAT32 | | | | |
| 8 | BLOCK_TEST | BLOCK_TEST | 8 | UINT8 | | | | |

Standard Parameters / Vendor Parameters / Form Layout / Methods

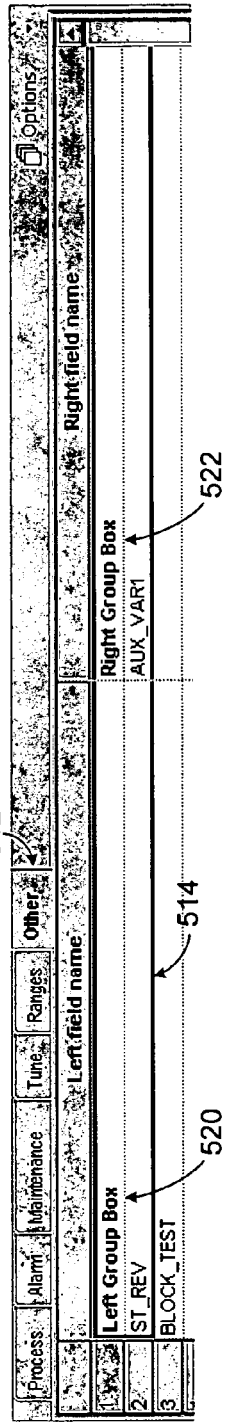
FIGURE 5E
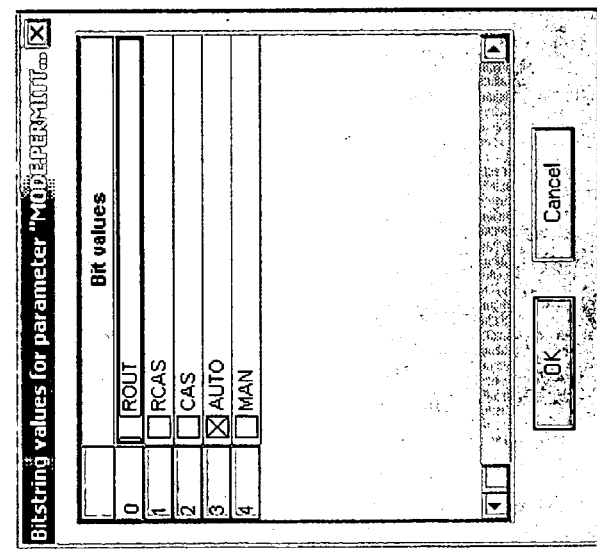
FIGURE 5G
FIGURE 5H

| | Method Name | Method Description |
|---|---|---|
| 1 | DD Version | This method will displays the version information for the DD and m |
| 2 | Auto Travel Calibration | Auto Travel Calibration will perform and Auto Calibrate Travel on t |
| 3 | Pressure Sensor Cal | Follow the prompts to calibrate the instrument output pressure se |
| 4 | Cal Tvl Sensor | This routine will calibrate the Travel Sensor feedback. |
| 5 | Input Characterization | This method will help the user set the input characterization for th |
| 6 | Manual Calibration | Manual calibration allows the user to set the travel end points and |
| 7 | Protect Transducer Data | This method will set the protection for particular types of data wit |
| 8 | Store/Restore Data | This method will restore various types of data stored in the DVC5 |
| 9 | Setup Wizard | Setup Wizard will prompt the user for information necessary to p |
| 10 | Stroke Valve | Stroke the valve to either set values, incremental values, or a use |
| 11 | Stabilize/Optimize Tuning | Select Decrease Response if instrument is unstable. Select Incre |
| 12 | Calibrate Abort | This method is executed whenever a calibration method is cancel |
| 13 | Cal Tvl Snsr Abort | This method will be executed whenever the Travel Sensor metho |
| 14 | Calibrate Abort w/Cal Cmd | This method is executed whenever a calibration method is cancel |
| 15 | Characterization Aborting | This is the method to be executed when the Characterization abo |
| 16 | Manual Cal Abort | This method is executed whenever the manual calibration method |
| 17 | Pressure Cal Abort | Method to be executed when the Pressure Sensor Calibration Met |
| 18 | Pressure Cal Abort2 | Method to be executed when the Pressure Calibration Method ab |
| 19 | Protect Data Abort | Method to be executed when the Protection Method aborts abnor |
| 20 | Data Restore Abort | Method to be executed when the Data Restore Method aborts ab |
| 21 | Robs Abort | Method to be executed when the Maintenance Backdoor Method |
| 22 | Motion Detection Abort | Method invoked when Motion Detection Method is Aborted |
| 23 | Stabilize/Optimize Abort | Method to be executed when the Stabilization Method aborts abn |
| 24 | Setup Wizard Abort | This is the method to be executed when the Wizard method abort |

\ Standard Parameters \ Vendor Parameters \ Form Layout \ Methods /

SYSTEM AND METHOD FOR DYNAMICALLY CREATING AND EDITING FUNCTION BLOCK TYPES IN A PROCESS CONTROL ENVIRONMENT

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

In conventional process control systems, controllers are often used to control the operation of the industrial equipment in the processing facilities. The controllers could, for example, monitor and control the operation of the industrial equipment and generate alarms when malfunctions occur.

"Control processes" are often implemented in conventional controllers using "function blocks." Control processes typically represent processes or functions implemented by the conventional controllers to control the industrial equipment in the processing facilities. Function blocks typically represent executable software objects that perform specific tasks. Any of a wide range of functions could be represented by the function blocks. A combination of particular function blocks may be used to implement a specific control process in a conventional controller.

Graphical interfaces may represent the function blocks using symbols (such as rectangles) that have specified parameters (such as inputs and outputs). Control processes may be defined graphically by selecting appropriate function blocks and linking the selected function blocks. For example, a graphical interface could be used to select function blocks and link the inputs and outputs of the symbols representing the selected function blocks. This allows processing facility operators who purchase or use the conventional controllers to create and modify control processes for particular processing facilities. However, the facility operators often have no mechanism for creating or editing the types of function blocks available in the conventional controllers or for creating or editing the parameters associated with those function block types.

SUMMARY

This disclosure provides a system and method for dynamically creating and editing function block types in a process control environment.

In a first embodiment, an apparatus includes a memory capable of storing information defining multiple function block types. A combination of instances of one or more function block types is capable of implementing a control process in a controller within a process control system. The apparatus also includes a function block editor capable of allowing a user to dynamically create or modify one or more of the function block types using a graphical user interface. The function block editor is capable of allowing the user to define one or more parameters for a function block type being created or modified.

In a second embodiment, a system includes a controller capable of controlling one or more process elements in a facility. The system also includes an apparatus having a memory capable of storing information defining multiple function block types. A combination of instances of one or more function block types is capable of implementing a control process in the controller. The apparatus also includes a function block editor capable of allowing a user to dynamically create or modify one or more of the function block types using a graphical user interface. The function block editor is capable of allowing the user to define one or more parameters for a function block type being created or modified.

In a third embodiment, a method includes receiving information from a user through a graphical user interface. The information is associated with one or more function block types. A combination of instances of one or more function block types is capable of implementing a control process in a controller within a process control system. The method also includes dynamically creating or modifying one or more of the function block types based on the information. The one or more created or modified function block types include one or more parameters defined by the user.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION OF EXAMPLE EMBODIMENTS

Figure 1:
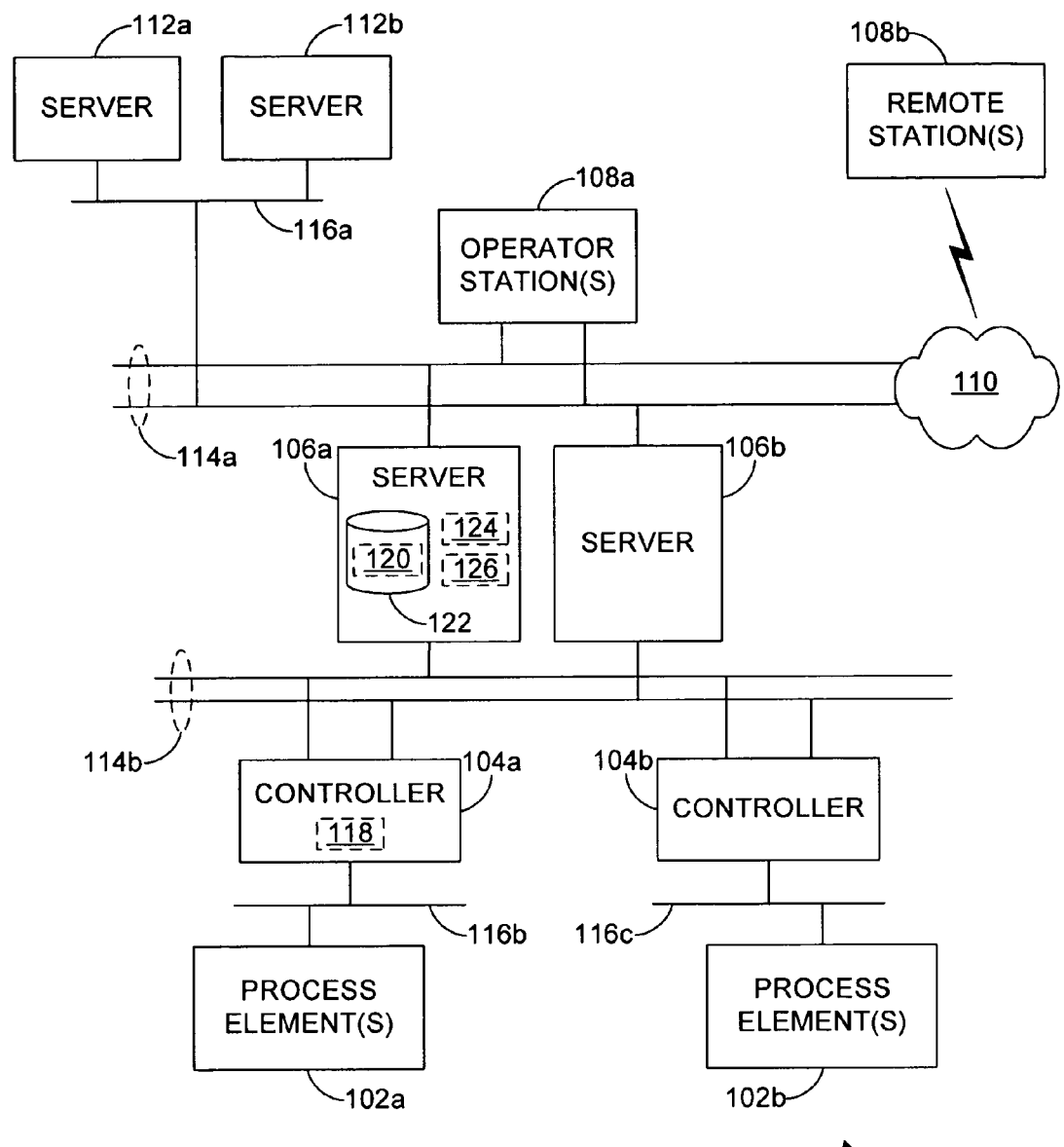
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

In this example embodiment, the process control system 100 includes one or more process elements 102a-102b. The process elements 102a-102b represent components in a processing environment that perform any of a wide variety of functions. For example, the process elements 102a-102b could represent motors, valves, and other industrial equipment in a processing environment. The process elements 102a-102b could represent any other or additional components in a processing environment. Each of the process elements 102a-102b includes any hardware, software, firmware, or combination thereof for performing one or more functions in a processing environment. The process elements 102a-102b could, for example, represent any component, device, or system capable of manipulating, altering, or otherwise processing one or more materials in a processing environment.

Two controllers 104a-104b are coupled to the process elements 102a-102b. The controllers 104a-104b control the operation of the process elements 102a-102b. For example, the controllers 104a-104b could periodically provide control signals to the process elements 102a-102b. Each of the controllers 104a-104b includes any hardware, software, firmware, or combination thereof for controlling one or more process elements 102a-102b.

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any hardware, software, firmware, or combination thereof for providing access to or control of the controllers 104a-104b. Each of the servers 106a-106b could, for example, include one or more processors and one or more memories capable of storing data and instructions used by the processors.

One or more operator stations 108a-108b are coupled to the servers 106a-106b. The operator stations 108a-108b represent computing or communication devices providing user access to the servers 106a-106b, which could then provide user access to the controllers 104a-104b and the process elements 102a-102b. For example, the operator stations 108a-108b could allow users to review the operational history of the process elements 102a-102b using information collected by the controllers 104a-104b and servers 106a-106b. The operator stations 108a-108b could also allow the users to adjust the operation of the process elements 102a-102b, controllers 104a-104b, or servers 106a-106b. Each of the operator stations 108a-108b includes any hardware, software, firmware, or combination thereof for supporting user access and control of the system 100. Each of the operator stations 108a-108b could, for example, include one or more processors and one or more memories capable of storing data and instructions used by the processors.

In this example, at least one of the operator stations 108b is a remote station. The remote station is coupled to the servers 106a-106b through a remote network 110. The network 110 facilitates communication between various components in the system 100. For example, the network 110 may communicate Internet Protocol (IP) packets, frame relay frames, Asynchronous Transfer Mode (ATM) cells, or other suitable information between network addresses. The network 110 may include one or more local area networks (LANs), metropolitan area networks (MANs), wide area networks (WANs), all or a portion of a global network such as the Internet, or any other communication system or systems at one or more locations.

In this example, the system 100 includes two additional servers 112a-112b. The servers 112a-112b execute various applications to control the overall operation of the system 100. For example, the system 100 could be used in a processing or production plant or other facility, and the servers 112a-112b could execute applications used to control the overall operation of the plant or other facility. As particular examples, the servers 112a-112b could execute applications such as enterprise resource planning (ERP), manufacturing execution system (MES), or any other or additional plant or process control applications. Each of the servers 112a-112b includes any hardware, software, firmware, or combination thereof for controlling the overall operation of the system 100. Each of the servers 112a-112b could, for example, include one or more processors and one or more memories capable of storing data and instructions used by the processors.

As shown in FIG. 1, the system 100 includes various redundant networks 114a-114b and single networks 116a-116c that support communication between components in the system 100. Each of these networks 114a-114b, 116a-116c represents any suitable network or combination of networks facilitating communication between components in the system 100. The networks 114a-114b, 116a-116c could, for example, represent Ethernet networks.

In one aspect of operation, control processes are implemented by the controllers 104a-104b, and the control processes are constructed using function blocks 118. The function blocks 118 represent executable software objects that perform specific tasks. Each function block 118 may also be represented graphically by a symbol and have specified parameters (such as one or more inputs and/or one or more outputs). To define a control process, a user may select particular function blocks 118 and link the inputs and outputs of the selected function blocks 118. The controllers 104a-104b could then implement the defined control process.

There may be any suitable type and number of function blocks 118 in the system 100. The function blocks 118 could, for example, include "component blocks" that represent basic functions. These basic functions could be combined into larger function blocks called "container blocks." "Stand-alone blocks" represent function blocks that do not contain component blocks and that are not contained within container blocks. These represent only examples of the types of function blocks 118 that may be used in the system 100. Other or additional types of function blocks 118 could be used in the system 100.

Different types of function blocks 118 are associated with different block definition files 120. A block definition file 120 defines various characteristics of an associated type of function block 118. For example, the block definition file 120 could define parameters (such as inputs and outputs) for a type of function block 118. The block definition file 120 could also define the symbol that graphically represents a type of function block 118. The block definition file 120 could further define a form layout for a type of function block 118, where the form layout is used later by a user to configure function blocks 118 for use in a control process.

In this example, the block definition files 120 are stored in a database 122. The database 122 includes any hardware, software, firmware, or combination thereof for storing and facilitating retrieval of information. The database 122 may use any of a variety of data structures, arrangements, and compilations to store and facilitate retrieval of information. In some embodiments, the database 122 represents an Engineering Repository Data Base ("ERDB"). Although shown as residing in the server 106a, the database 122 could be located in any suitable location(s).

Control processes are constructed with the function blocks 118 using a process builder 124. The process builder 124 provides a graphical user interface that allows a user to create or edit control processes using the graphical symbols representing the types of function blocks 118. For example, the process builder 124 may allow the user to select particular types of function blocks, which presents the graphical symbols representing the selected types of function blocks to the user. The user may then link the inputs and outputs of the selected types of function blocks. Instances of the selected function blocks types (the function blocks 118) may then be created and used to implement a control process. The process builder 124 includes any hardware, software, firmware, or combination thereof for creating or editing control processes. The process builder 124 could, for example, represent a CONTROL BUILDER application by HONEYWELL INTERNATIONAL, INC.

As noted above, conventional process control systems typically lack a mechanism for allowing users to create or edit function block types or the parameters associated with the function block types. In accordance with this disclosure, users have access to a function block editor 126. The block editor 126 provides a graphical user interface that allows a user to create or edit function block types and to create or edit parameters associated with function block types. For example, the block editor 126 may allow users to create, edit, or delete block definition files 120, which allows the users to control which types of function blocks 118 are available for use in the process control system 100.

In particular embodiments, the block editor 126 may be used to create or edit custom algorithm function block types, custom data block types, and function block types for Foundation Fieldbus devices. Custom algorithm blocks contain user-defined algorithms and user-defined data structures. Custom data blocks support user-defined data parameters. Foundation Fieldbus blocks are used with devices supporting Foundation Fieldbus technology, which supports dynamic integration of dedicated field devices with digitally based control systems. Instances of these function block types defined by the users may then be incorporated into control processes using the process builder 124. This represents only several examples of the types of function blocks that may be created, edited, or deleted using the block editor 126. The block editor 126 may be used to create, edit, or delete any other or additional types of function blocks. As a particular example, the block editor 126 could be used to create, edit, or delete proprietary function block types used within a system or controller.

The block editor 126 includes any hardware, software, firmware, or combination thereof for creating or editing function block types or their associated parameters. The block editor 126 could, for example, be implemented as an Active-X Control. Details of one example embodiment of the block editor 126 are shown in FIGS. 2 through 8C, which are described below.

Although FIG. 1 illustrates one example of a process control system 100, various changes may be made to FIG. 1. For example, a control system could include any number of process elements, controllers, servers, and operator stations. Also, FIG. 1 illustrates one operational environment in which the block editor 126 could be used. The block editor 126 could be used in any other suitable device or system. Further, although shown as residing in the server 106a, the block editor 126 may be located in any suitable location(s), such as residing on multiple servers or one or more of the operator stations 108a-108b. In addition, while shown as separate components, the process builder 124 and the block editor 126 could be integrated into a single application or unit.

FIGS. 2 through 8C illustrate an example function block editor 126 for creating and editing function block types and their associated parameters in a process control system according to one embodiment of this disclosure. The details of the function block editor 126 shown in FIGS. 2 through 8C are for illustration only. Other function block editors that operate in a different manner could also be used. Also, for ease of explanation, FIGS. 2 through 8C are described with respect to the block editor 126 operating in the process control system 100 of FIG. 1. The same or similar functionality could be used by any other suitable tool and in any other suitable system.

In general, the block editor 126 shown in FIGS. 2 through 8C supports user interfaces for creating and editing various types of function blocks 118, such as Foundation Fieldbus function block types, custom algorithm function block types, and custom data function block types. As shown in the following figures, in some embodiments, the block editor 126 supports various grid interfaces for creating and editing function block types and their parameters. The grids are configurable and customized to the specific type of function block being created or edited. As a particular example, separate grids could be provided for creating or editing parameter attributes for a type of function block, symbol attributes for a type of function block, and a form layout for a type of function block. The symbol attributes define how a graphical symbol representing a type of function block appears in the process builder 124. The form layout defines a form used to configure parameters of instances of the function block type in the process builder 124.

The block editor 126 itself could be launched inside a container application in the process control system 100. For example, the block editor 126 could be launched within the process builder 124 as a Multiple Document Interface (MDI) child window or within Visual Studio .NET. These container applications may configure the block editor 126 based on their requirements for editing specific types of function blocks. For example, as described in more detail below, the block editor 126 may be configured to display only standard and vendor parameters for Foundation Fieldbus block types, only fixed, custom, and parameter references for custom algorithm block types, and only fixed and custom parameters for custom data block types.

In the description and figures that follow, the block editor 126 may support the following functionality. Rows and columns of grids can be resized, and grid cells having a grey background color represent read-only cells. New rows may be added to a grid using an insert key or from a right-click menu accessed by right-clicking a mouse. New rows can be appended to a grid from the right-click menu, and existing rows can be deleted using a delete key or from the right-click menu. Multiple rows can be added and deleted from a grid. Columns can be sorted by clicking or double-clicking on column headers, and the sorting may toggle between ascending and descending order. Navigation between grid cells can be done using arrow keys or a tab key. Grid cells can be edited using an edit box, a check box, a combo box, or an editing grid. An edit box cell can be edited by highlighting the cell and entering a value or by double-clicking on the cell and entering the value. A check box cell has a check box in the cell, and clicking on the check box toggles the value in the cell. A combo box cell has a drop down menu with options that can be selected. A default bit string value may be edited in an editing grid that is accessed via a button in or near a cell, or a bit string value may be directly entered in the cell. Default arrayed parameter values can be edited in an editing grid that is accessed via a button in or near a cell, and the size of the array may be shown in a default value column. The block editor 126 may or may not show all attributes of various parameters. Some attributes could be internally managed, while other attributes may be hidden from a user and assigned default values. The user is allowed to copy an entire parameter definition, irrespective of whether attributes are internally managed or hidden by the user. Cut, copy, and paste functions may be used (using the right-click menu or hot keys) to copy an entire parameter definition and paste the definition as a new parameter. This may also be used across different instances of the block editor 126. While this has listed specific mechanisms for implementing particular functions in one embodiment of the block editor 126, other or additional mechanisms could also be used in the block editor 126.

Figure 2:
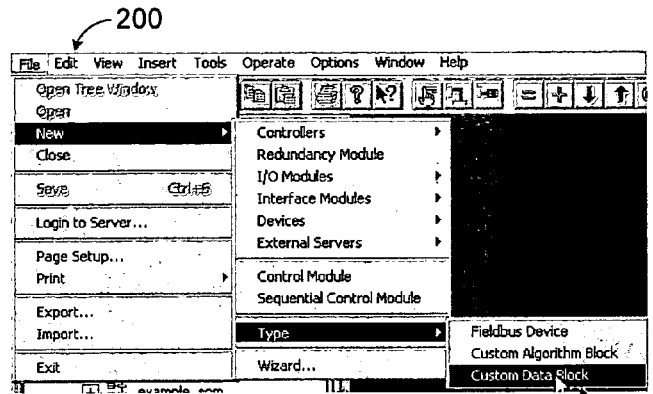
FIGS. 2 through 8C illustrate an example function block editor for creating and editing function block types and their associated parameters in a process control system according to one embodiment of this disclosure.

As shown in FIG. 2, the block editor 126 includes or is accessed through a menu system 200. By navigating through the menu system 200, a user may view a list 202 of function block types that can be created using the block editor 126. In this example, the block editor 126 can be used to create Foundation Fieldbus function block types, custom algorithm block types, and custom data block types. In other embodiments, the menu system 200 could list any other or additional types of function blocks, such as proprietary block types.

Figure 3:
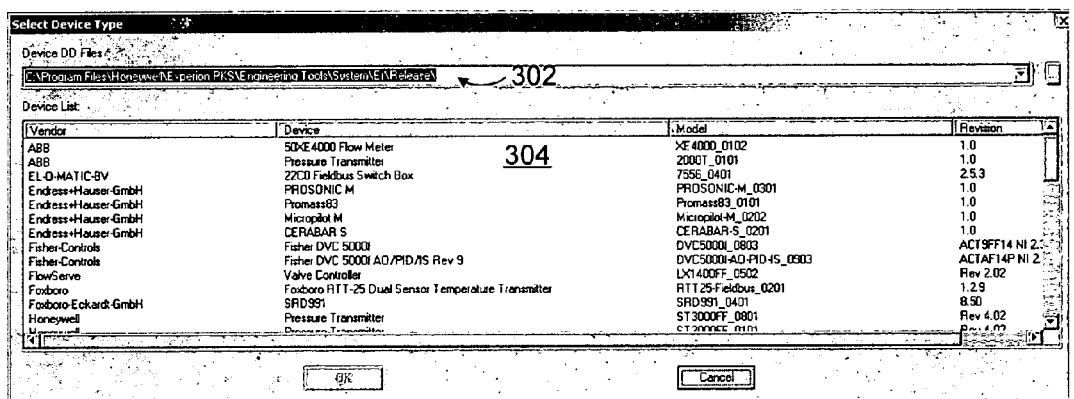

Selecting the Foundation Fieldbus option in the list 202 provides the user with a device selection form 300 shown in FIG. 3. The device selection form 300 allows the user to select a Fieldbus Foundation device, such as a device used in the process control system 100. A new type of function block may be created for the selected Fieldbus Foundation device.

As shown in FIG. 3, the device selection form 300 includes a Device Description (DD) file location entry 302. The file location entry 302 identifies the location in the system 100 (such as a server 106a or 106b) where DD files associated with Fieldbus Foundation devices are located. The new type of function block may be created for the Fieldbus Foundation device associated with one or more of the DD files.

The device selection form 300 also includes a device list 304, which lists the Fieldbus Foundation devices associated with the DD files stored at the specified file location entry 302. In this example, the device list 304 lists Fieldbus Foundation devices by vendor name, device name, model name, and software revision.

The user may select one of the devices listed in the device list 304. The block editor 126 then creates a new type of function block for the identified device. For example, the block editor 126 may read the DD file(s) associated with the selected device, create a new block definition file 120, and store the new definition file 120 in the database 122. The block editor 126 could create the new definition file 120 in any suitable manner, such as by creating a definition file 120 with standard and vendor-specified parameters and standard default values. Different dialog boxes could be provided that identify the status of each of the reading, creating, and storing activities. This process could also be halted or cancelled at the user's request. The new function block type (and the associated definition file 120) could have any suitable name, such as a name based on the selected device. To avoid overwriting existing definition files 120, the user may be given the option of changing the name of the new function block type, and the block editor 126 could recommend alternate name(s) for the new function block type.

Figure 4:
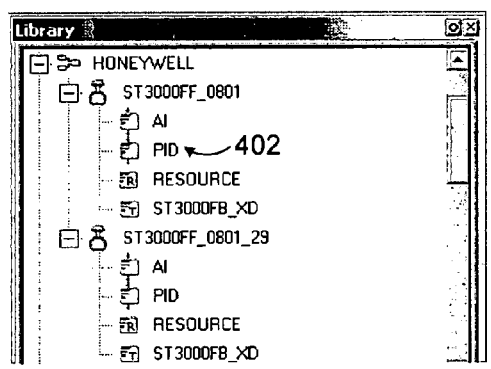

After successful creation of the definition file 120 for the new function block type, the name of the new function block type appears in a library tree 400, which is shown in FIG. 4. In FIG. 4, the library tree 400 includes various entries 402, which identify different function block types that are currently available for editing or deletion. For example, the user could double-click one of the entries 402 in the library tree 400 to reveal a window, which is used to edit the associated function block type. Also, a right-click menu for an entry 402 could contain options for editing and deleting the associated function block type.

If the user chooses to edit a Foundation Fieldbus function block type associated with an entry 402, the user is presented with a Foundation Fieldbus parameter editor window 500, which is shown in FIGS. 5A through 5H. The parameter editor window 500 includes the library tree 400 from FIG. 4. The parameter editor window 500 also includes a project window 502, which can be used to select different locations in a computing system (such as a location in the database 122) for storing information associated with function block types.

The parameter editor window 500 further includes four tabs 504. The tabs 504 allow different information to be presented to and edited or controlled by the user. In this example, the tabs 504 provide the user with different forms or windows for editing standard and vendor-specified parameters of a Foundation Fieldbus function block type, defining a form layout for the function block type, and view Fieldbus methods available for use with the function block type.

Selection of the standard parameters tab 504 reveals a standard parameters editor 506 in the parameter editor window 500. The standard parameters editor 506 is shown in more detail in FIG. 5B. The standard parameters editor 506 identifies parameters that are standard for the selected Foundation Fieldbus device in the system 100. The standard parameters editor 506 allows the user to view and configure the standard parameters associated with the selected Foundation Fieldbus function block type. Changes made to the standard parameters may then be reflected in the block definition file 120 for the function block type. For example, the standard parameters editor 506 may allow the user to view and configure attributes of the standard parameters. Table 1 illustrates the various attributes of the standard parameters that could be shown in and edited using the standard parameters editor 506 in some embodiments of the block editor 126.

TABLE 1

| Parameter Attribute | Description |
| --- | --- |
| Parameter Name | A name of the parameter. |
| Parameter Description | A short description of the parameter. It may be restricted to 255 characters. It may be used in a "Configure Parameters" dialog of the process builder 124. |
| First Dimension Array Size | A first dimension of an array if the parameter is to be arrayed. |
| Second Dimension Array Size | A second dimension of an arrayed parameter. |
| First Dimension Lower bound | A lower bound of the first array dimension. |
| Second Dimension Lower bound | A lower bound of the second array dimension. |
| Configuration Load | An attribute indicating whether the parameter value is to be loaded into an Advanced Control Environment. |
| Access Lock | An attribute describing what kind of users can write to the parameter. |
| Data Type | A data type of the parameter. |
| Default Value | A default value of the parameter. |
| Minimum Value | A minimum value of the parameter. This may be applicable to integer and float data types. |
| Minimum Value Reference | A parameter within the same block type that holds the minimum value for this parameter. |
| Maximum Value | A maximum value of the parameter. This may be applicable to integer and float data types. |
| Maximum Value Reference | A parameter within the same block type that holds the maximum value for this parameter. |
| Size | A size of a default value for a string data type. This may be applicable to string, struct, and bit string data types. |
| Permission | A permission for the parameter. |
| Unit | A unit for the parameter. |
| Unit Reference | A parameter within the same block type that holds the unit value for this parameter. |

In particular embodiments, the parameter name, first dimension array size, data type, and size parameter attributes are read-only attributes. No new parameters can be added and no existing parameters can be deleted in the standard parameters editor 506. Also, the minimum value and minimum value reference attributes are mutually exclusive, the maximum value and maximum value reference attributes are mutually exclusive, and the unit and unit reference attributes are mutually exclusive. Editing of the minimum value, maximum value, and default value attributes may depend on the data type parameter attribute. The minimum and maximum value and reference attributes are valid only for the integer and float data types, and these attributes are read-only for other data types. The default value attribute can be changed if the access lock attribute is "Not View Only" ("View Only" would allow viewing of the parameter only and not editing) and the data type is not "STRUCT." The default value attribute is validated for the limits of the minimum and maximum values. The permission attribute may not be edited for "STRUCT" data type parameters and for members of a "MODE" parameter group (as described in more detail below). The parameter description, parameter help string, and default value attributes may be case-sensitive attributes. The particular attributes shown in the standard parameters editor 506 can be changed and controlled using the "manage views" functionality described below.

Selection of the vendor parameters tab 504 reveals a vendor parameters editor 508 in the parameter editor window 500, which is shown in FIG. 5C. The vendor parameters editor 508 identifies manufacturer-specific parameters for the selected Foundation Fieldbus device in the system 100. The vendor parameters editor 508 allows the user to view and configure the manufacturer-specific parameters associated with the selected Foundation Fieldbus function block type. The vendor parameters editor 508 may function in the same or similar manner as the standard parameters editor 506. For example, the same attributes shown in Table 1 could be displayed for each vendor parameter. Changes made to the vendor parameters may then be reflected in the block definition file 120 for the function block type.

Figure 5A:
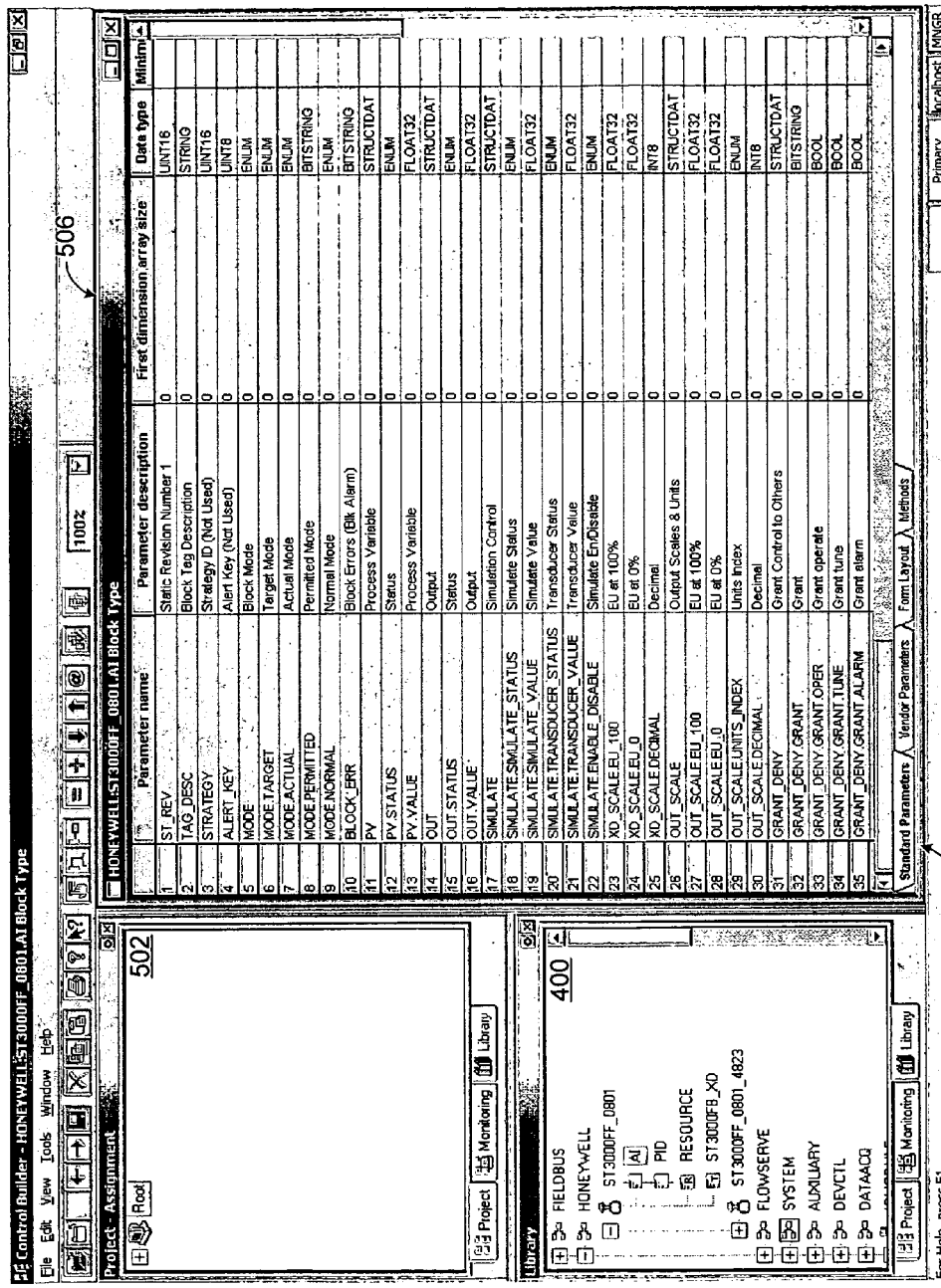
Figure 5D:
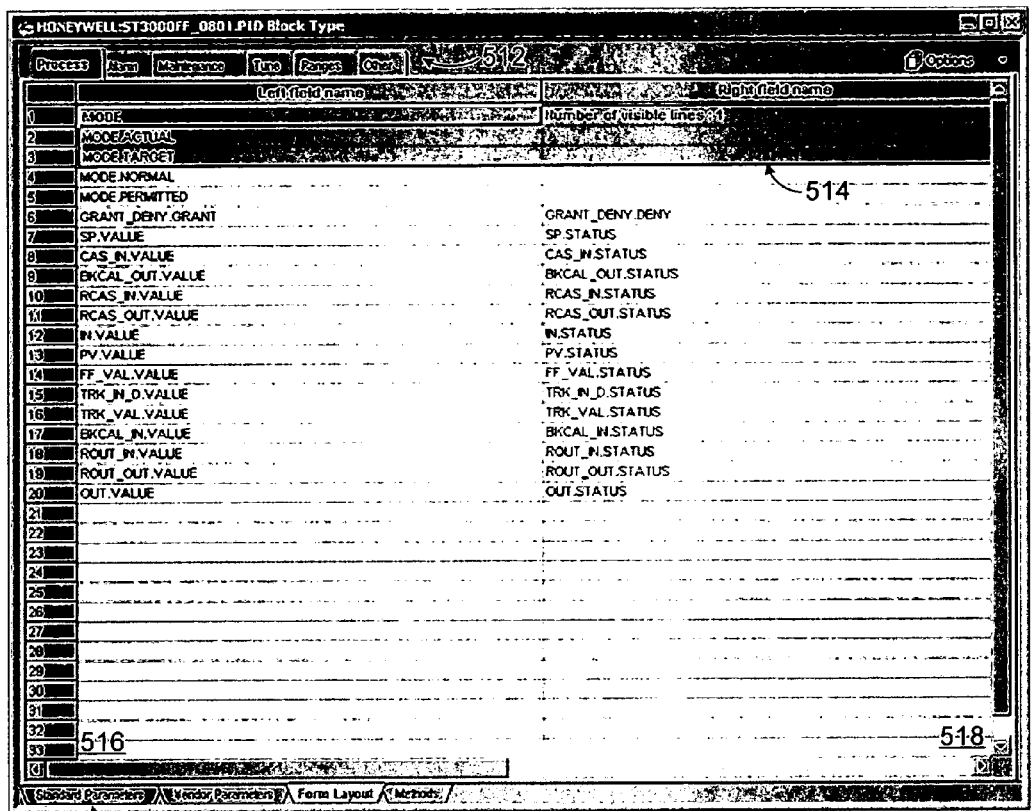

Selection of the form layout tab 504 reveals a form layout editor 510 in the parameter editor window 500, which is shown in FIG. 5D. As noted above, a form layout represents a form used to configure parameters of a function block 118 in the process builder 124. This may occur, for example, when an instance of the Foundation Fieldbus function block type is being incorporated into a control process, and the parameters are configured in a "Configure Parameters" dialog. The "Configure Parameters" dialog may show the function block's parameters in the same way as defined in the form layout editor 510. Changes made to the form layout using the form layout editor 510 may be reflected in the block definition file 120 for the function block type.

As shown in FIG. 5D, the function block type's parameters are organized in the form layout editor 510 using tabs 512 and group boxes 514. The form layout editor 510 is also divided into a left column 516 and a right column 518 for each tab 512. In general, the tabs 512 represent different categories of function block parameters, and the group boxes 514 represent groups of related function block parameters within a tab 512. The columns 516-518 are used because the "Configure Parameters" dialog in the process builder 124 may include multiple columns.

In this example, the tabs 512 divide the function block parameters into process, alarm, maintenance, tuning, range, and other groups. Also, a single "MODE" group 514 is shown in the "Process" tab 512. The "MODE" group 514 contains a structured mode parameter that is configured with the permitted modes in which a function block 118 can be used. The structured mode parameter includes an actual mode, a target mode, a permitted mode, and a normal mode. The normal mode is the desired operating mode, and the actual mode identifies the mode used during execution of the function block's logic. The target mode may be set and monitored through the mode parameter, and the permitted mode defines the allowable target mode settings.

The parameters may be initially organized in the form layout editor 510 as defined by a template builder. The template builder represents an application capable of reading Foundation Fieldbus DD files and generating a template (which contains the listing of parameters initially shown in the form layout editor 510). The template builder could, for example, read Foundation Fieldbus DD files using "Foundation DD Services" and translate the DD files into Experion templates.

Each group box 514 may group parameters that are logically related to each other. This may be useful, for example, when a group of parameters is to be seen together, such as in the "Configure Parameters" dialog of the process builder 124. A group box 514 can be created in the left column 516 or in the right column 518 of the form layout editor 510. The grouped parameters in the left column 516 may be referred to as a left group, and the grouped parameters in the right column 518 may be referred to as a right group.

Parameters can be grouped into a group box 514 or ungrouped from a group box 514 using any suitable mechanism. For example, a user may select multiple entries in the left column 516 of the form layout editor 510 (such as a sequence of rows) and select a menu option grouping the rows. The user could also select a group box 514 and select a menu option ungrouping the rows in the selected group box 514.

As shown in FIG. 5E, once selected parameters are grouped, the group is shown inside a group box 514 (represented by a thick black rectangle around the selected parameters). A left field name cell 520 in the first row of the group is for entering a name of the left group. Parameters can be added within the group box by inserting new rows inside the group box. Once a left group box is created, parameter names may be entered into the right column 518 of the group. A right field name cell 522 in the first row of the group is for entering a name of the right group. The left and right grouped parameters may be shown in the process builder 124 as a grouped set of parameters.

In particular embodiments, only standard and vendor parameters are shown in the form layout editor 510 for the Foundation Fieldbus function block type. Parameters can be added and deleted from the tabs 512, and a single parameter can be used once across all the tabs 512 in the form layout editor 510. Tabs 512 may be added, renamed, and deleted from the form layout editor 510, such as by using a right-click menu. Read-only tabs (such as the "Alarm" tab 512) and groups (such as the "MODE" group 514) may not be modified or deleted. The tabs 512 can be rearranged by dragging and dropping the tabs 512 in the form layout editor 510. In addition, rules may be enforced in grouping parameters. For example, a right group box may be completely dependent on the definition of a left group box, where the right group box may not exist without a left group box. In other words, there may not be a parameter in a right group box without any parameters in a left group box. Blank rows in a group may have no effect on the form layout. A left group name may be required if any parameters are defined in a left group box, and a right group name may be required if any parameters are defined in a right group box. A height of the group box may be based on the number of parameters in the left group box. These represent example rules that could be used in the block editor 126. Other or additional rules could also be used.

Finally, selection of the methods tab 504 reveals a methods window 524 in the parameter editor window 500, which is shown in FIG. 5F. The methods window 524 lists the Foundation Fieldbus methods that are available for use in the Foundation Fieldbus function block type. The methods listed may be based on the methods associated with the selected Foundation Fieldbus device. In this example, the methods window 524 lists the methods and descriptions of the methods for the function block type. In some embodiments, the grid in the methods window 524 is read-only and may not be shown if the block type does not have any associated methods.

As described above, parameters whose data type is "BIT-STRING" may have default values associated with the parameters. One mechanism for entering and editing bit string default values is shown in FIG. 5G. In particular, FIG. 5G illustrates a bit string editing grid 526, which allows default values to be created or edited for bit string parameters. The possible bit string values (and the associated bit values) for a parameter are shown in the bit string editing grid 526. In this example, the left column contains the bit values, and the right column contains descriptions of the bit values. A bit value can be selected by checking or un-checking the check box in the right column.

Also, as described above, parameters in the function block type may represent arrayed parameters (parameters formed from arrays). One mechanism for entering and editing default values for an arrayed parameter is shown in FIG. 5H. In particular, FIG. 5H illustrates an arrayed parameter editing grid 528, which allows default values to be provided for an arrayed parameter. Based on the size of the arrayed parameter, the appropriate number of rows and columns are shown in the arrayed parameter editing grid 528. Default values may then be set for individual elements of the arrayed parameter. A single dimension array may be shown with one column, where the rows correspond to the first dimension of the array. A two-dimension array may be shown with two columns as shown in FIG. 5H, where the columns correspond to the second dimension of the array. The editing of each individual cell in the arrayed parameter editing grid 528 may be based on the data type of the parameter. Also, the values entered may be validated for their associated ranges using the minimum and maximum values of the parameter.

In addition, various views may be defined to control the information provided in the parameter editor window 500. Views are used to control which columns of a grid are presented to a user. For example, views may control which parameter attributes are displayed to the user in the standard parameters editor 506 and the vendor parameters editor 508. In some embodiments, views may be specific to a user or specific to a function block type. For views specific to the function block type, the view information may be carried in the definition file 120 of the function block type. For views specific to a user, the views may be available only to the user who defined the view and only on the system where the views are created.

Figure 6:
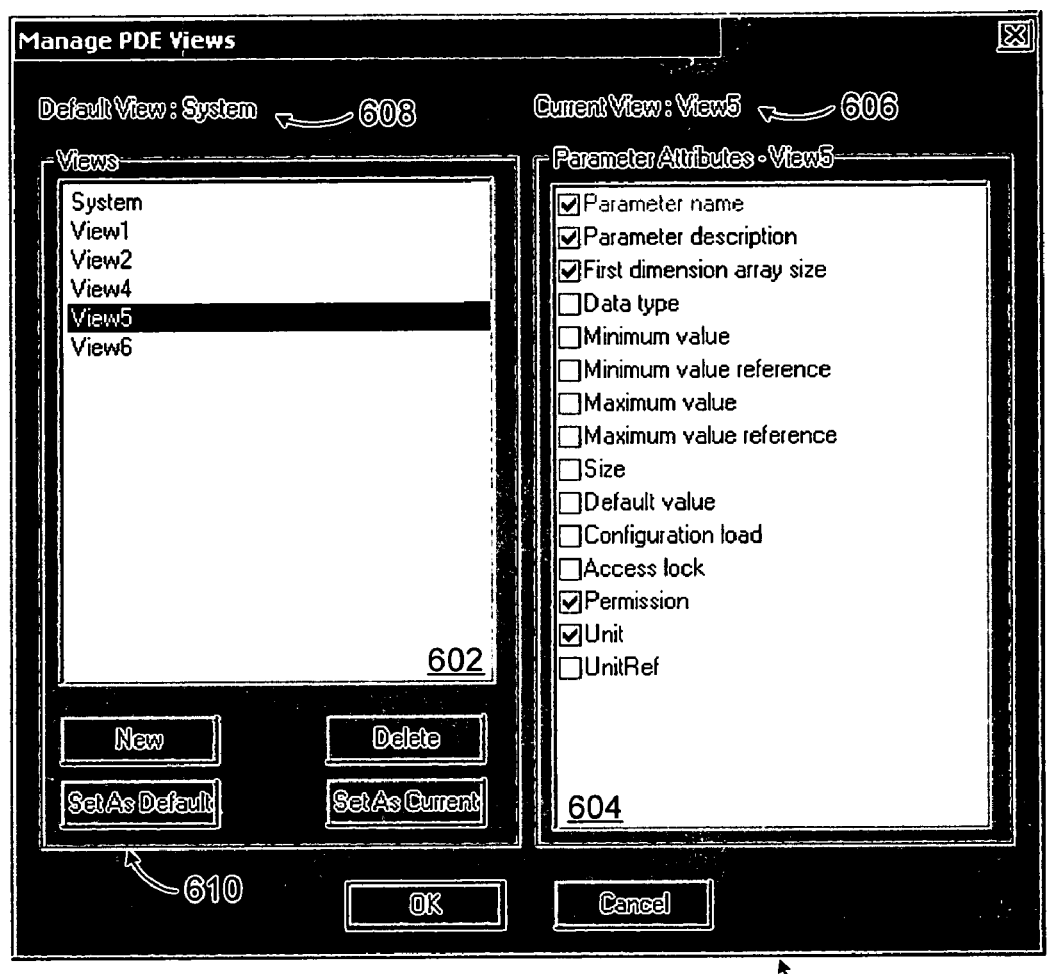

FIG. 6 illustrates a view manager 600, which is used to control the views in the parameter editor window 500 (along with additional parameter editor windows described below). The view manager 600 may be accessed in any suitable manner, such as through a menu system of the block editor 126.

As shown in FIG. 6, the view manager 600 includes a views list 602, which lists the currently defined views for selection by the user. The listed views could, for example, represent all of the views created or defined by the user using the parameter editor window 500. The view manager 600 also includes an attributes list 604. The checked parameter attributes in the attributes list 604 represent the parameter attributes that are displayed to a user using the current view 606 (which is also the highlighted view in the views list 602). The user may modify an existing view by checking and unchecking the various parameter attributes in the attributes list 604. One of the views listed in the views list 602 may be selected by the user as a default view 608, which is used to display information to the user when the user has not expressly selected a different view.

In this example, the views list 602 represents a single selection list (where a single view can be selected), and the attributes list 604 represents a multi-selection list (where multiple attributes can be selected). In particular embodiments, mandatory parameter attributes may be greyed in the attributes list 604 and may always remain selected (cannot be turned off by the user). Also, a "System" view that shows all parameter attributes could be provided in the views list 602, and the user may be unable to modify the attributes list 604 for the "System" view.

The view manager 600 also includes various buttons 610. The "New" button allows a user to create a new view that is listed in the views list 602. The user may be allowed to name the new view and select the parameter attributes in the attributes list 604 for the new view. The "Delete" button allows a user to delete an existing view (except the "System" view). A default view may be selected using the "Default" button, which sets the default view 608 for all current and later uses of the parameter editor window 500 (unless the default view is changed again). A current view may be selected using the "Current" button, which sets the view for the current use of the parameter editor window 500.

FIGS. 5A through 5H have illustrated various mechanisms for creating and editing a Foundation Fieldbus function block type, where information about the function block type is stored in a definition file 120. Once creation or editing of a function block type is complete, the definition file 120 may be used by the process builder 124 to incorporate instances (function blocks 118) of the defined function block type into a control process. One or more of the controllers 104a-104b may then execute the control process using the function blocks 118.

As shown in FIG. 2, a user could also create a new custom data block type using the list 202 of the menu system 200. If the user chooses to create a custom data block type, the user may be allowed to name the new custom data block type and to specify a library in which information about the new custom data block type is stored. The library could be selected from a pull-down menu (for existing libraries) or by entering a library name. In particular embodiments, the block type name and library name could represent strings of fifty characters or less, and the block type name may be unique within the selected library.

Once the new custom data block type is specified, a definition file 120 for the new block type is created, and the block type appears in the library tree 400. After being listed in the library tree 400, a user may edit, rename, or delete the new custom data block type. If the user chooses to edit a custom data block type, the user is presented with a parameter editor window 700, which is shown in FIGS. 7A through 7H.

The parameter editor window 700 includes the library tree 400 from FIG. 4 and a project window 702. The parameter editor window 700 also includes four tabs 704. The tabs 704 allow different information about a selected custom data block type to be presented to and edited or controlled by the user. In this example, the tabs 704 provide the user with different forms or windows for editing fixed parameters, custom parameters, a form layout, and symbol attributes of a custom data block type. Changes made to the parameters, form layout, or symbol attributes may be reflected in the block definition file 120 for the function block type.

Selection of the "Value CDPs" (Custom Data Parameters) tab 704 reveals a custom parameters editor 706 in the parameter editor window 700. The custom parameters editor 706 allows a user to create, delete, and modify custom parameters. For example, the custom parameters editor 706 may allow the user to define or modify the attributes from Table 1 for each custom parameter desired by the user. The view provided in the custom parameters editor 706 may be controlled using the same or similar technique implemented by the view manager 600.

In some embodiments, new custom parameters are assigned default attribute values that may be edited by the user. Table 2 illustrates example default attribute values that may be assigned to a new custom parameter.

TABLE 2

| Parameter Attribute | Attribute Default Value |
| --- | --- |
| Configuration load | NO LOAD |
| First dimension array size | 0 |
| Second dimension array size | 0 |
| First dimension array lower bound | 0 |
| Second dimension array lower bound | 0 |
| Default Size for the string data type | 32 |

Table 3 illustrates additional default attribute values that may be assigned to a new custom parameter, depending on the data type of the custom parameter.

TABLE 3

| Data type | Minimum Value | Maximum Value |
| --- | --- | --- |
| INT32 | −2147483648 | 2147483647 |
| FLOAT64 | 2.2250738585072014e−308 | 1.7976931348623158e+308 |
| STRING | — | 255 Characters |

The custom parameters editor 706 also validates the values provided for the attributes of the new custom parameters. Table 4 illustrates example valid values for the parameter attributes.

TABLE 4

| Parameter Attribute | Valid values |
| --- | --- |
| Parameter Name | The first character of the parameter name may be an alphabet letter. The "_" character and alphanumeric characters may be used in the parameter name. The maximum length of the parameter name may be 12 characters. The parameter name may be converted to upper case letters. |
| Parameter Description | Any characters, with a maximum length of 255. |
| First Dimension Array Size | >=0. 0 means the parameter is not arrayed. |
| Second Dimension Array Size | >=0. 0 means the second dimension is not specified. The first dimension array size should be >0 to enter the second dimension array size. |
| First Dimension Lower bound | Positive/Negative INT16 value. The first dimension array size should be >0 to enter this attribute. |
| Second Dimension Lower bound | Positive/Negative INT16 value. The second dimension array size should be >0 to enter this attribute. |
| Configuration Load | LOAD—Load the parameter. NOLOAD—Do not load the parameter. |

TABLE 4-continued

| Parameter Attribute | Valid values |
| --- | --- |
| Access Lock | APPDEVONLY, ENGINEER, OPERATOR, PROGRAM, SUPERVISOR |
| Data Type | BOOLEAN, DELTATIME, FLOAT64, INT32, STRING, TIME, TIMEOFDAY |
| Default Value | Specific to data type attribute. |
| Minimum Value | Specific to data type attribute. |
| Maximum Value | Specific to data type attribute. |
| Size | >=0. |
| Parameter Help String | No limit. |

In some embodiments, the "Default Value" attribute may not be edited if the "Configuration Load" attribute is set to "NOLOAD". Instead, the default value may be reset to nothing. Also, setting the "Access Lock" attribute to "View Only" may set the "Configuration Load" attribute to "NOLOAD". This makes the "Default Value" attribute read-only (it cannot be edited by the user), and the default value is reset to nothing. Further, changing some of the attributes of a custom parameter may prevent saving the function block type with the same prior name. This may occur, for example, when changing the data type of a custom parameter, deleting a custom parameter from the function block type, or renaming any custom parameter of the function block type. When this occurs, the definition file 120 for the edited function block type may be saved under a different name.

Figure 7A:
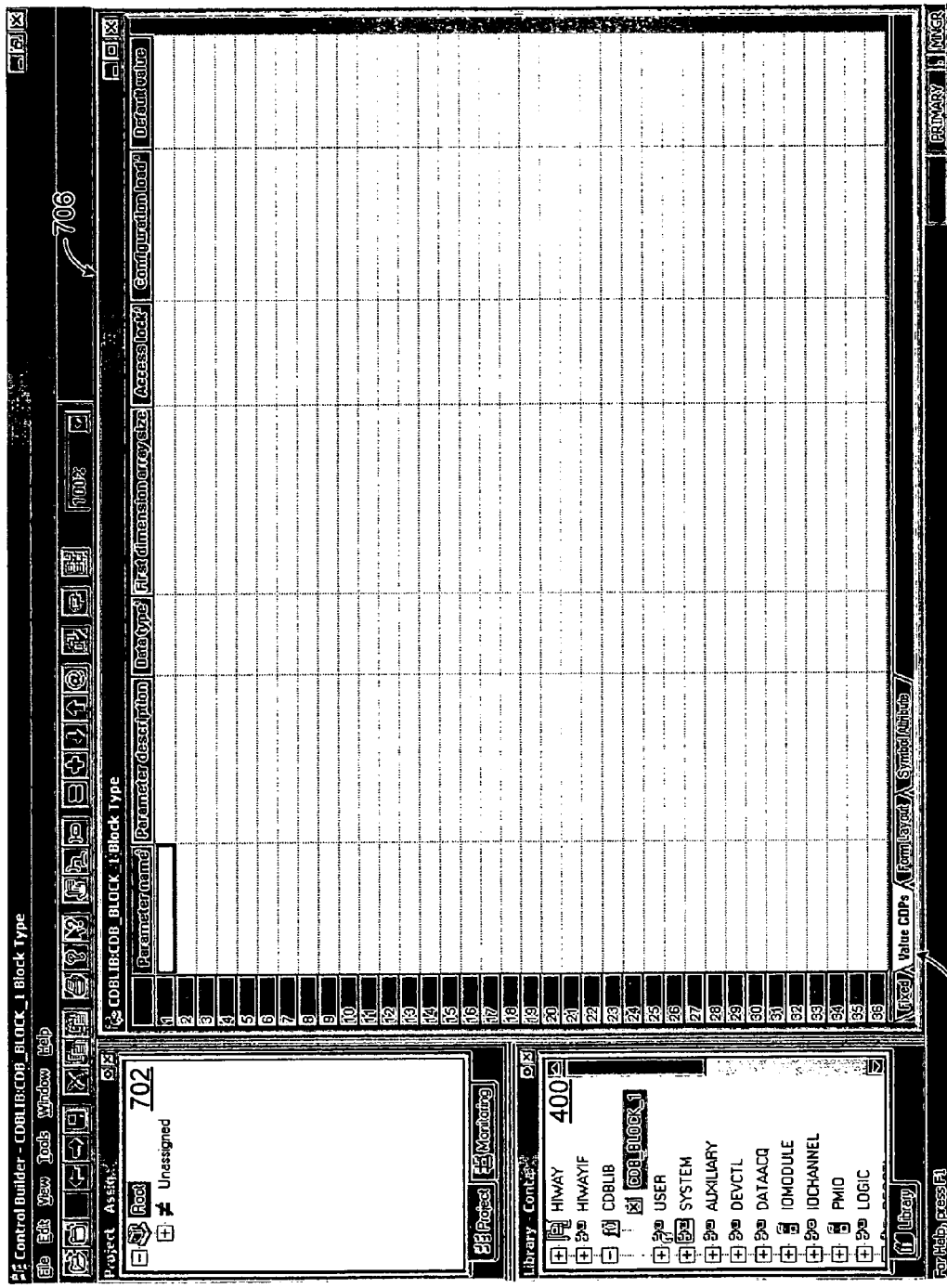
Figure 7B:
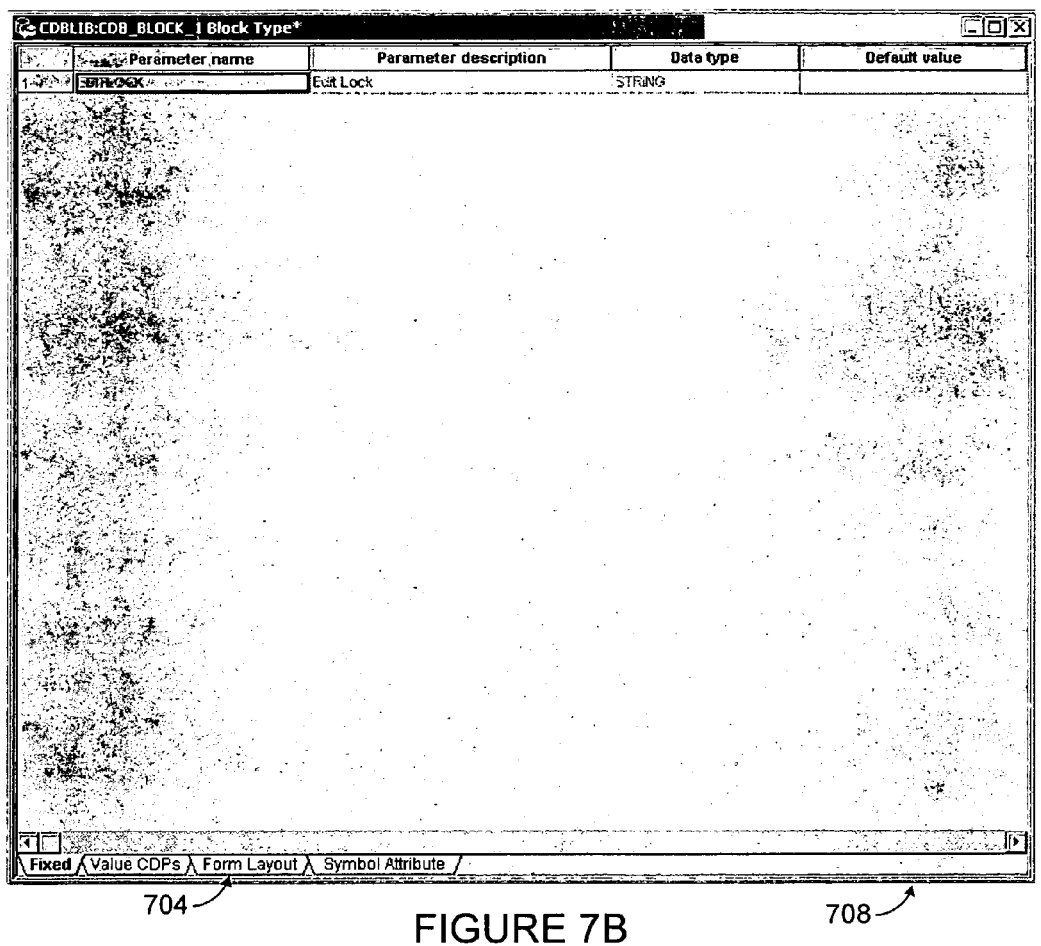

Selection of the fixed parameters tab 704 reveals a fixed parameters editor 708 in the parameter editor window 700, which is shown in FIG. 7B. The fixed parameters represent the parameters that are fixed in the system 100 for custom data block types. In this example, the fixed parameters editor 708 is used to edit only the default value attributes of the fixed parameters. The other parameter attributes are read-only. In particular embodiments, editing of a default value is based on the data type of the parameter attribute, new parameters may not be added, and existing parameters may not be deleted. Table 5 illustrates various attributes of fixed parameters shown in the fixed parameters editor 708 in some embodiments of the block editor 126.

TABLE 5

| Parameter Attribute | Description |
| --- | --- |
| Parameter Name | A name of the parameter. |
| Parameter Description | A short description of the parameter. |
| Data Type | A data type of the parameter. |
| Default Value | A default value of the parameter. |

Figure 7C:
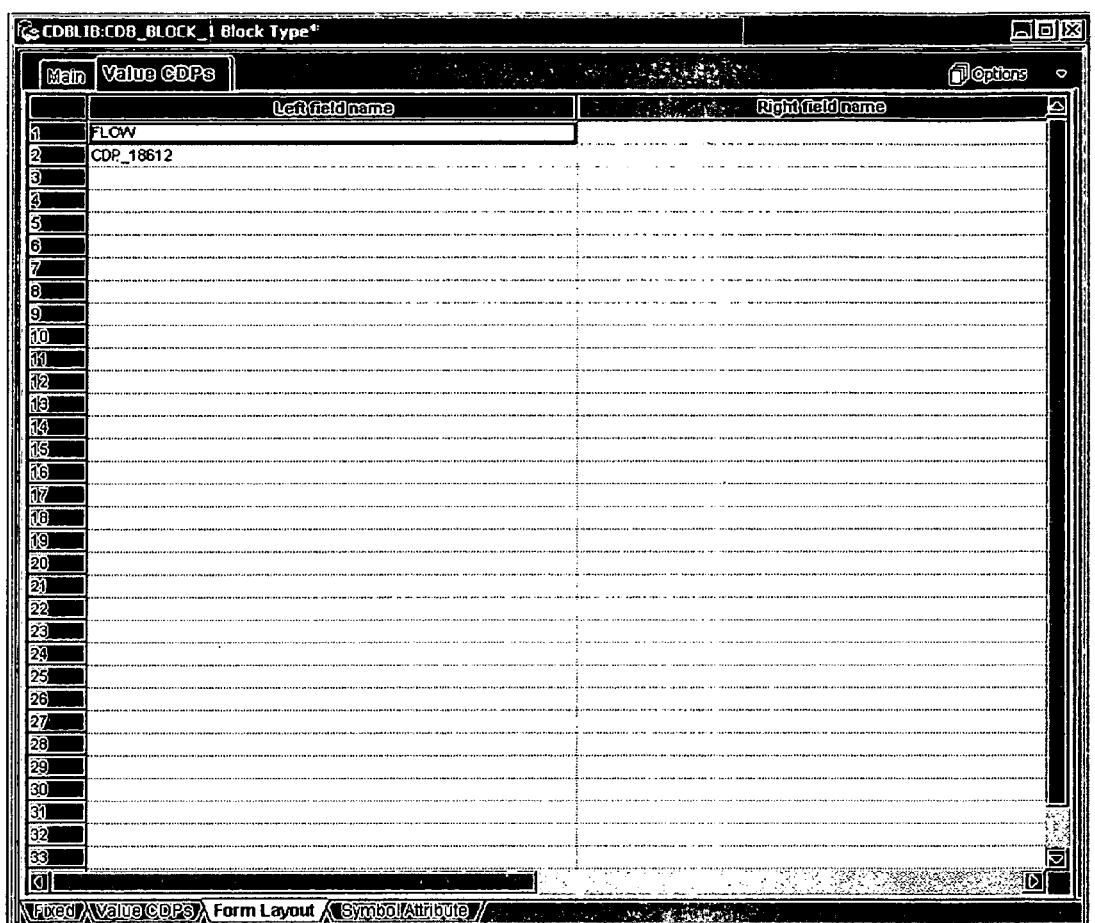

Selection of the form layout tab 704 reveals a form layout editor 710 in the parameter editor window 700, which is shown in FIG. 7C. The form layout editor 710 allows a user to use tabs, groups, and grids to create a form, which is used to configure the parameters of an instance of the custom data block type when the instance is incorporated into a control process by the process builder 124. The use of tabs and groups may occur in the same or similar manner as in the form layout editor 510 of FIG. 5D.

In particular embodiments, the "Value CDPs" tab in the form layout editor 710 lists the custom parameters defined using the custom parameters editor 706. The order of the custom parameters in the form layout editor 710 may be the same as the order in which the custom parameters were defined in the custom parameters editor 706. This layout may be automatically generated when a custom parameter is defined or deleted in the custom parameters editor 706. Also, any change in the order of the custom parameters in the custom parameters editor 706 may be reflected in the form layout editor 710. In addition, the "Main" tab of the form layout editor 710 may not be renamed or deleted.

The form layout editor 710 also allows users to create grids using the defined custom parameters. Each parameter belonging to a grid is a column of the grid, and rows in the grid display values of the parameters. A grid may be created by selecting parameters in the form layout editor 710 and choosing the appropriate option in a menu. Once created, a grid box 712 is shown as in FIG. 7D. The grid box 712 includes a number of visible lines, which represents the maximum number of rows that should be shown to a user at the time of displaying the grid in the process builder 124. If there are a larger number of rows than visible lines at the time of display, a scroll bar may be shown next to the grid.

Figures 7D, 7E:
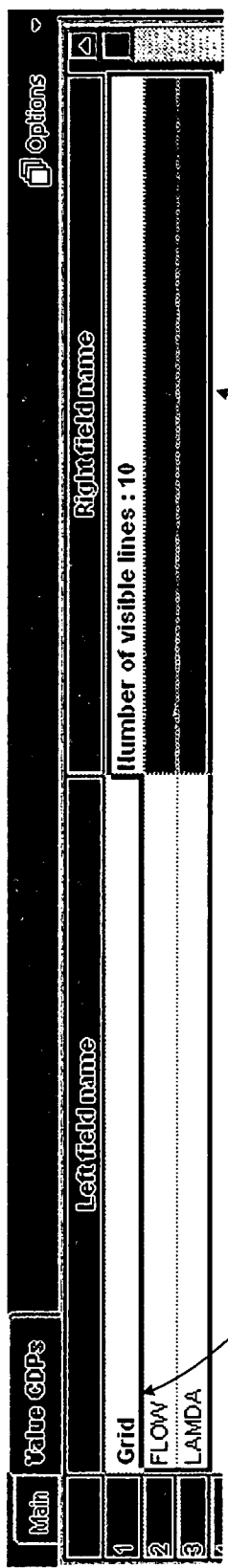

In some embodiments, parameters may be added to a grid box 712 by inserting new rows and entering parameter names in the left field name. Parameters may also be deleted by selecting and deleting a row from the grid box 712. A grid name 713 may be entered in the first row of the grid under the left field name. A defined parameter grid may be shown in the process builder 124 as shown in FIG. 7E. In FIG. 7E, a defined parameter grid 714 contains two parameters, both of which are single dimension arrayed parameters. A defined parameter grid 716 contains one two-dimension arrayed parameter (a 5×5 arrayed parameter), and the left column of the defined parameter grid 716 contain a two-dimension array index. If a defined parameter grid contains both one-dimension and multi-dimension parameters, each parameter may be displayed as shown in the defined parameter grid 714, and the left column of the defined parameter grid may display row numbers only (not a multi-dimension array index). A grid may be deleted by selecting the complete grid and choosing an appropriate option from a menu. The grid could also be deleted by deleting the first row of the grid.

In particular embodiments, a grid name 713 may be required and may be entered in the left field name. The number of rows visible may be greater than zero and less than one hundred. There may be no right field name for the grid, and only arrayed parameters may be allowed in the grid.

In some embodiments, the form layout editor 710 supports the automatic generation of a form layout. The automatic form layout generation may generate the form layout from the order of the parameters defined in the form layout editor 710. This feature may be available for parameters listed in the custom parameters editor 706, and the parameters may have the same order in the form layout editor 710. The "Value CDPs" tab in the form layout editor 710 represents the tab in which the custom parameters are shown. Any custom parameter added in the custom parameters editor 706 may be added to this tab of the form layout editor 710. Also, any update to the parameters in the custom parameters editor 706 may be reflected in the form layout editor 710.

In particular embodiments, any difference in the order of the parameters in the custom parameters editor 706 and the form layout editor 710 may be handled as follows. A parameter may be added to the end of the form layout editor 710 if the appropriate place for the new parameter could not be identified. If this fails, the parameter may be added to the "Main" tab of the form layout editor 710. A failure of both may generate an error, and the parameter may be added manually. If generation of the form layout is disturbed because of an error, the form layout can be regenerated from a menu, which creates the form layout by placing the custom parameters in the left field name of the form layout.

Figure 7F:
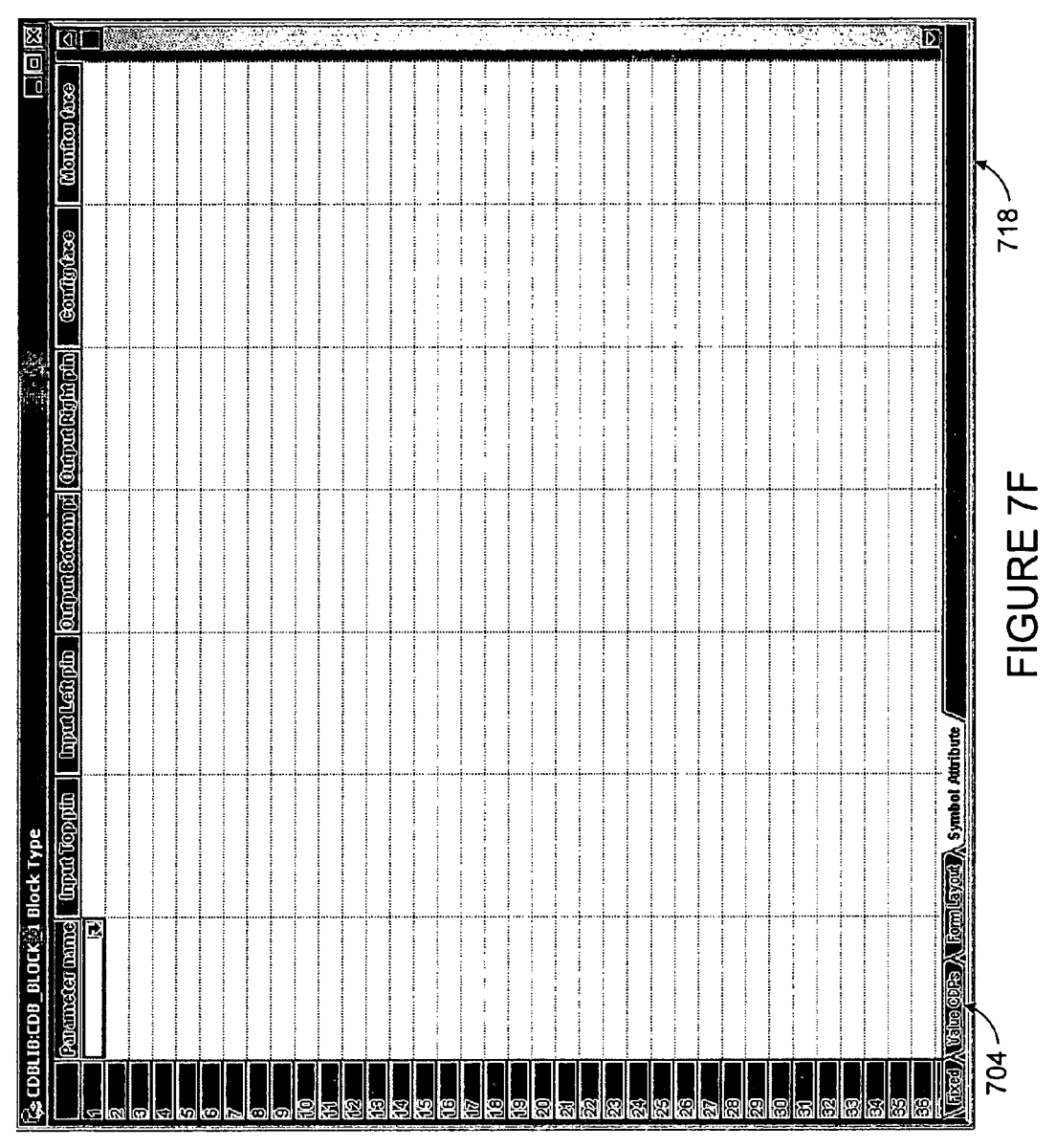

Finally, selection of the symbol attributes tab 704 reveals a symbol attributes editor 718 in the parameter editor window 700, which is as shown in FIG. 7F. As noted above, a symbol may be created for each function block type. The symbol attributes editor 718 allows a user to, within the symbol, associate input or output pins and pin numbers with parameters of the function block type. Each parameter that has a valid pin exposure permission (which controls whether a parameter can be assigned a corresponding pin) can be assigned to a pin. Also, individual elements of an arrayed parameter can be assigned to a pin.

As shown in FIG. 7F, a particular custom parameter can be selected in a row using a pull-down menu or a parameter selection dialog. Also, each input parameter can be represented by an input pin on the top or left side of the symbol representing the function block type. Each output parameter can be represented by an output pin on the bottom or right side of the symbol representing the function block type. A parameter could appear within the symbol itself during configuration, where the parameter is said to reside within a "configuration faceplate" ("config face") of the function block type. In addition, a parameter could appear along a side of the symbol when displayed, where the parameter is said to form part of a "monitor faceplate" ("monitor face") of the function block type.

A pin number for a parameter may be assigned by entering a value in the grid of the symbol attributes editor 718. For example, entering a value of "3" in the "Input Left pin" column would assign a left pin with a pin number of "3" to a parameter. A pin number for an input or output parameter could be assigned by entering a value in the appropriate column, and the pin values in each column may be unique and represent values greater than or equal to zero. Also, the order of parameters appearing the configuration or monitor faceplate are defined by the values in the "config face" and "monitor face" columns. For example, if a value of "2" is entered in the "Config face" column, a parameter would appear second in the configuration faceplate.

In particular embodiments, if a parameter may not be assigned a pin, the relevant row of cells in the grid may be left blank or greyed. The top pins and the left pins may be mutually exclusive, and the bottom pins and the right pins may be mutually exclusive. Parameters defined as "NOLOAD" parameters may not be configured to reside in the configuration faceplate. For arrayed parameters, individual array indices may be used to associate an individual array cell to a pin, such as by using the syntax <parameter name>[[first dimension index], [second dimension]]. An entire arrayed parameter can be assigned to a pin using the syntax <parameter name>[.<space>].

Figure 7G:
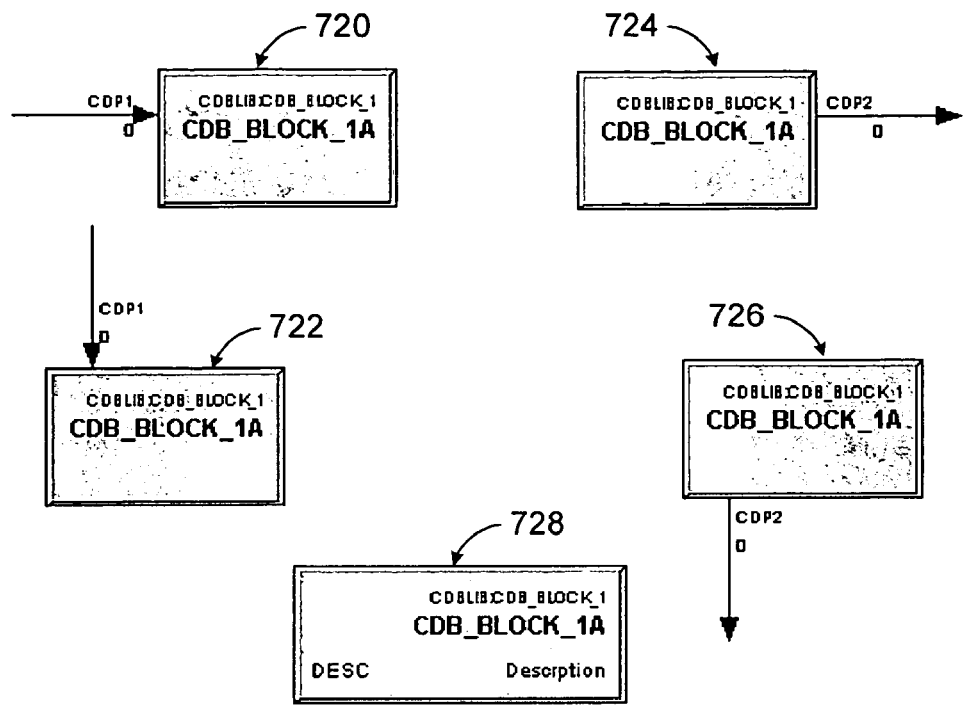

FIG. 7G illustrates five possible symbols 720-728 that could be created for a custom data block type using the symbol attributes editor 718 of FIG. 7F. The symbol 720 represents a symbol having a "CDP1" parameter assigned to a left input pin numbered zero. The symbol 722 represents a symbol having the "CDP1" parameter assigned to a top input pin numbered zero. The symbol 724 represents a symbol having the "CDP2" parameter assigned to a right output pin numbered zero. The symbol 726 represents a symbol having the "CDP2" parameter assigned to a bottom output pin numbered zero. Finally, the symbol 728 represents a symbol having the "DESC" parameter assigned to the configuration faceplate of the function block type. These symbols may be shown to the user when the user is using the process builder 124 to define a control process that includes an instance of the custom data block type.

Figure 7H:
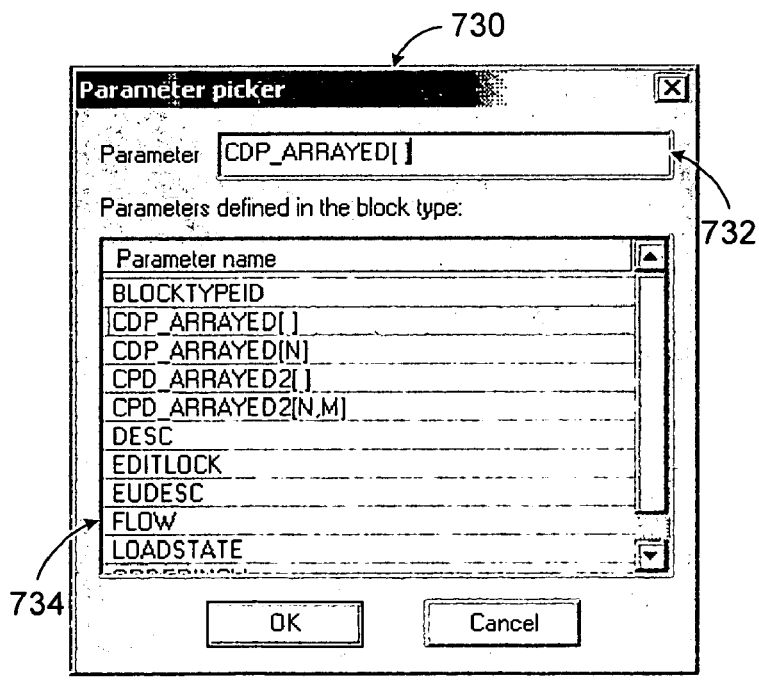

In some embodiments, as noted above with respect to FIG. 7F, a particular custom parameter can be selected using a parameter selection dialog. One example of a parameter selection dialog 730 is shown in FIG. 7H. The parameter selection dialog 730 could be accessed, for example, when the user is using the symbol attributes editor 718 to select which parameter is inserted into a particular row of the symbol attributes editor 718.

As shown in FIG. 7H, the parameter selection dialog 730 includes an edit box 732 and a parameter list 734. The edit box 732 represents an area of the parameter selection dialog 730 where the user may type part or all of the name of a parameter. The parameter list 734 presents the parameters that have a valid pin exposure permission that may be selected by the user for insertion into a row of the symbol attributes editor 718. The parameters listed in the parameter list 734 may be sorted in any suitable order (such as alphabetical). Typing part of a parameter name in the edit box 732 may highlight the nearest matching parameter in the parameter list 734. Selecting the "OK" button in the parameter selection dialog 730 may insert the highlighted parameter into the symbol attributes editor 718. Double-clicking could also be used to insert the highlighted parameter into the symbol attributes editor 718.

If a parameter is arrayed, the parameter name may be shown in various forms in the parameter list 734. For example, an entire arrayed parameter may be listed using the syntax <parameter name>[<space>]. A single-dimension arrayed parameter may be listed using the syntax <parameter name>[N], where N is the dimension of the array. A two-dimension arrayed parameter may be listed using the syntax <parameter name>[N, M], where N and M are the dimensions of array. If an individual array element of an arrayed parameter is to be assigned a pin in the symbol attributes editor 718, the entire arrayed parameter may be selected in the parameter selection dialog 730, and the specific index of the array element may be specified in the "Parameter Name" column of the symbol attributes editor 718.

Using the parameter editor window 700, a user could assign default bit string values and default arrayed parameter values to appropriate parameters in a custom data block type. For example, the user could use the same or similar mechanism shown in FIGS. 5G and 5H as described above. If using the arrayed parameter editing grid 528 as shown in FIG. 5H with a custom data block type, the matrices of an array could have negative as well as positive values.

FIGS. 7A through 7H have illustrated the creation and editing of a custom data block type, where information about the custom data block type is stored in a definition file 120. Once creation or editing of a custom data block type is complete, the definition file 120 of the custom data block type may be used by the process builder 124 to incorporate instances (function blocks 118) of the custom data block type into a control process.

As shown in FIG. 2, a user could also create a new custom algorithm block type using the list 202 of the menu system 200. If the user chooses to create a custom algorithm block type, the user may be allowed to name the new custom algorithm block type and to specify a library in which information about the new custom algorithm block type is stored. The library could be selected from a pull-down menu (for existing libraries) or by entering a library name. In particular embodiments, the block type name and library name could represent strings of fifty characters or less, and the block type name may be unique within the selected library.

Once the new custom algorithm block type is specified, a definition file 120 for the new block type is created, and the block type appears in the library tree 400. After being listed in the library tree 400, a user may edit, rename, or delete the new custom algorithm block type. If the user chooses to edit a custom algorithm block type, the user is presented with a parameter editor window 800, which is shown in FIGS. 8A through 8C.

Figure 8A:
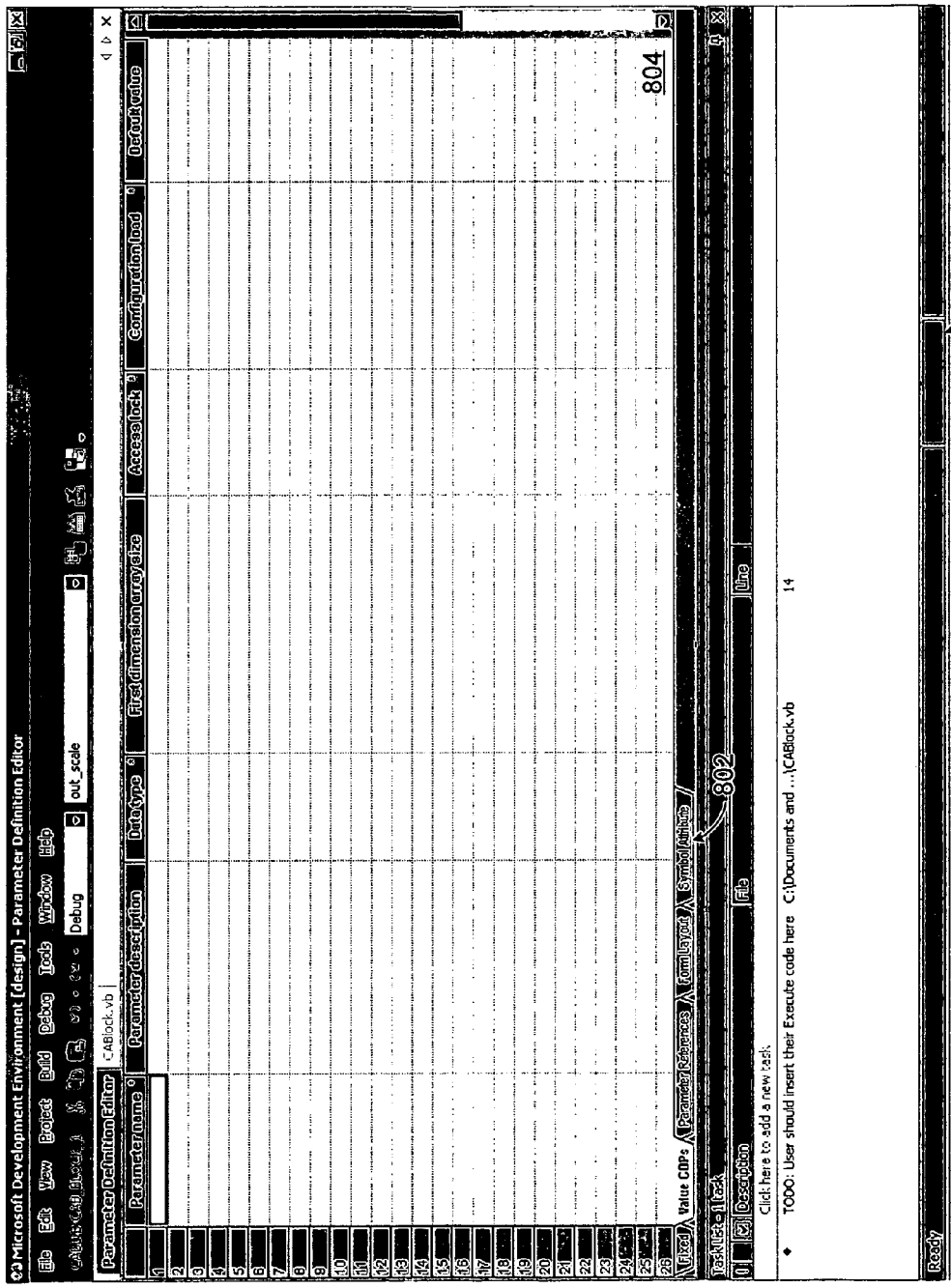

As shown in FIG. 8A, the parameter editor window 800 includes five tabs 802. In this example, the tabs 802 provide the user with different forms or windows for editing fixed parameters, custom parameters, parameter references, a form layout, and symbol attributes of a custom algorithm block type. The "Fixed" tab 802, the "Value CDPs" tab 802, the "Form Layout" tab 802, and the "Symbol attributes" tab 802 may operate in the same or similar manner as the corresponding tabs 704 in the parameter editor window 700 described above.

Selection of the custom parameters tab 802 reveals a custom parameters editor 804 in the parameter editor window 800, which is shown in FIG. 8A. The custom parameters editor 804 may operate in the same or similar manner as the custom parameters editor 706. In some embodiments, the columns shown in FIG. 8A are the columns shown by default, and this view may be altered by the user.

Figure 8B:
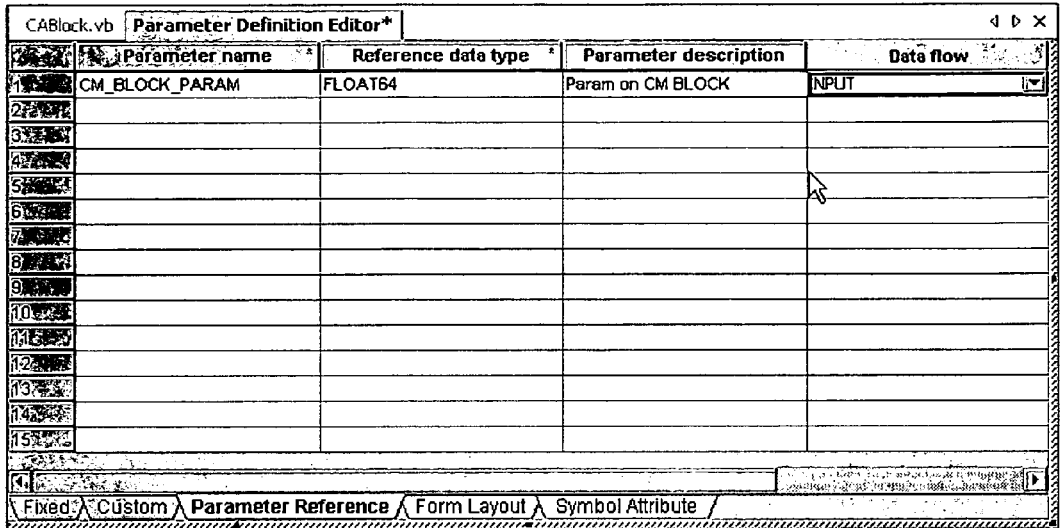
Figure 8C:
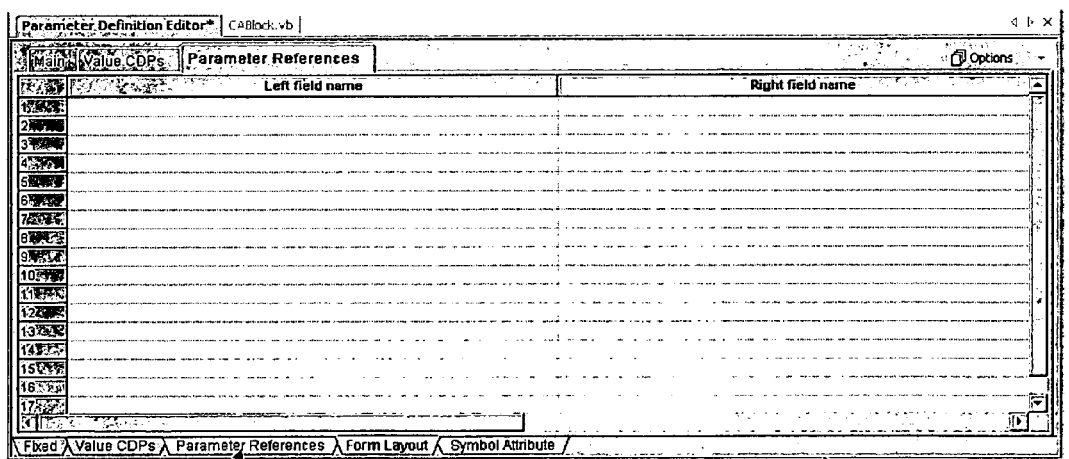

Selection of the parameter reference tab 802 reveals a parameter reference editor 806 in the parameter editor window 800, which is shown in FIG. 8B. The parameter reference editor 806 allows a user to define aliases or reference values for the parameters of the custom algorithm block type. New parameter references can be added, which define the data type and the data flow of a parameter. New parameters can also be added, and existing parameters can be deleted. New parameters defined in the parameter reference editor 806 could be automatically inserted into the form layout for the custom algorithm function block type. The parameter description attribute may be case sensitive. Table 6 illustrates various attributes of parameters shown in the parameter reference editor 806 in some embodiments of the block editor 126.

TABLE 6

| Parameter Attribute | Description |
| --- | --- |
| Parameter Name | A name of the reference parameter. |
| Reference data type | A data type of the reference parameter. |
| Parameter Description | A short description of the parameter. It may be restricted to 255 characters. |
| Data flow | An attribute specifying the reference parameter is being used for input, output, or both. |

In particular embodiments, the "Data Flow" parameter attribute in the parameter reference editor 806 may default to the "Input" value. Also, the values entered into the parameter reference editor 806 may be validated. Table 7 illustrates example valid values for the parameter attributes.

TABLE 7

| Parameter Attribute | Valid values |
| --- | --- |
| Parameter Name | The first character of the parameter name may be an alphabet character. The "_" character and alphanumeric characters may be used in the parameter name. The maximum length of the parameter name may |

TABLE 7-continued

| Parameter Attribute | Valid values |
|---|---|
| | be 32 characters. The parameter name may be converted into upper case letters. |
| Parameter Description | Any characters, with a maximum length of 255. |
| Data Type | BOOLEAN, DELTATIME, FLOAT64, INT32, STRING, TIME, TIMEOFDAY |
| Data flow | INPUT—Only reading of data is allowed OUTPUT—Only writing of data is allowed IN/OUT—Data can be either read/written. |

Selection of the form layout tab 802 reveals a form layout editor 808 in the parameter editor window 800, which is shown in FIG. 8C. The form layout editor 808 may operate in the same or similar manner as the form layout editor 710 shown in FIG. 7C. The form layout editor 808 allows the user to use tabs, groups, and grids to create a form, which is used to configure parameters of an instance of the function block type when the instance is incorporated into a control process.

As shown in FIG. 8C, the form layout editor 808 includes a tab that allows the user to define a form for the parameter references defined using the parameter reference editor 806. The order of the custom parameters in the "Value CDPs" tab and the parameter references in the "Parameter References" tab of the form layout editor 808 may be the same as the order in which they were defined in the custom parameters editor 804 and the parameter reference editor 806, respectively. These layouts may be automatically generated when a custom parameter or parameter reference is defined or deleted in the custom parameters editor 804 or the parameter reference editor 806. Also, any change in the order of the custom parameters or the parameter references may be reflected in the "Value CDPs" tab or the "Parameter References" tab of the form layout editor 808.

In particular embodiments, any difference in the order of the parameters in the custom parameters editor 804 or the parameter reference editor 806 and the form layout editor 808 may be handled as follows. A parameter or parameter reference may be added to the end of the form layout editor 808 if the appropriate place for the new parameter or parameter reference could not be identified. If this fails, the parameter or parameter reference may be added to the "Main" tab of the form layout editor 808. A failure of both may generate an error, and the parameter or parameter reference may be added manually. If generation of the form layout is disturbed by an error, the form layout can be regenerated from a menu, which creates a form layout by placing the custom parameters and parameter references in the left field name of the form layout.

Using the parameter editor window 800, a user could also assign default bit string values and default arrayed parameter values to appropriate parameters. For example, the user could use the same or similar mechanism shown in FIGS. 5G and 5H as described above. If using the arrayed parameter editing grid 528 as shown in FIG. 5H with a custom algorithm block type, the matrices of an array could have negative as well as positive values. Further, the user could use the same or similar mechanism shown in FIG. 6 to control or define the views used in the parameter editor window 800. In addition, the parameter selection dialog 730 of FIG. 7H could be used with the parameter editor window 800, such as when the parameter selection dialog 730 allows the user to select parameters in a symbol attributes editor accessed when the "Symbol attributes" tab 802 is selected.

FIGS. 8A through 8C have illustrated the creation and editing of a custom algorithm block type, where information about the custom algorithm block type is stored in a definition file 120. Once creation or editing of a custom algorithm block type is complete, the definition file 120 of the custom algorithm block type may be used by the process builder 124 to incorporate instances of the custom algorithm block type into a control process.

Figure 9:
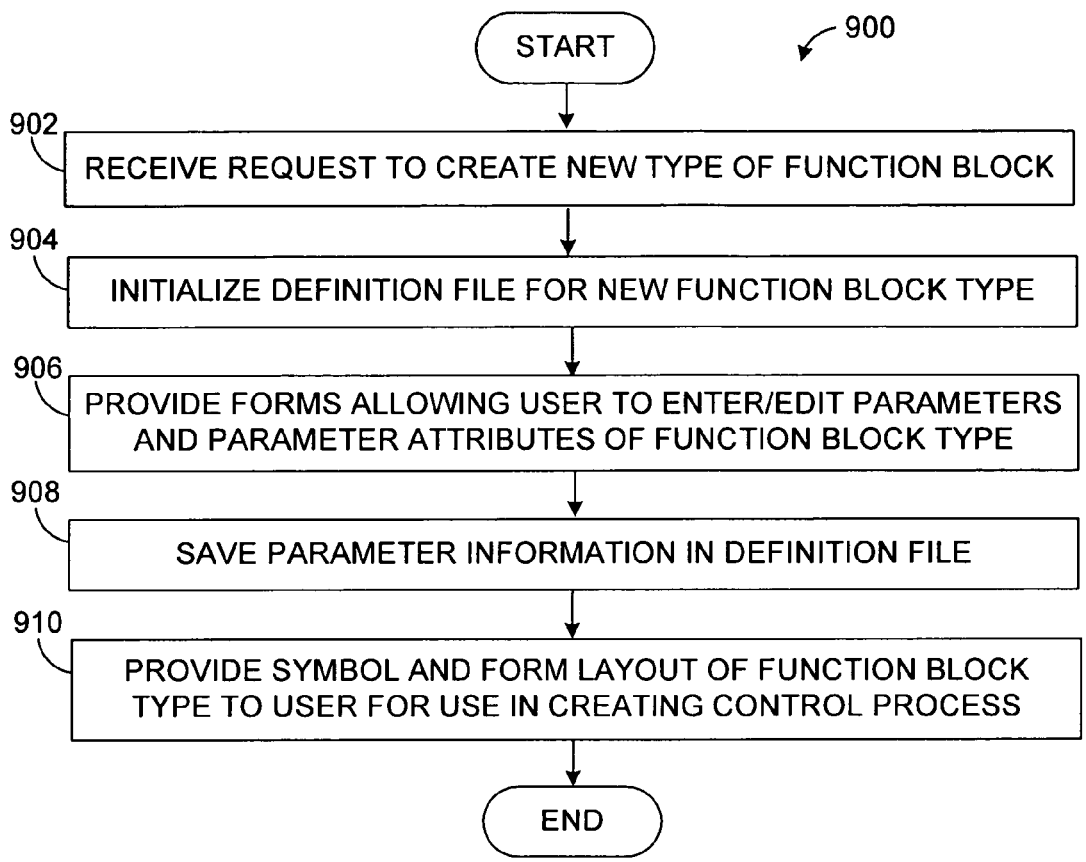
FIG. 9 illustrates an example method for creating and editing function block types and their associated parameters in a process control system according to one embodiment of this disclosure.

FIG. 9 illustrates an example method 900 for creating and editing function block types and their associated parameters in a process control system according to one embodiment of this disclosure. For ease of explanation, the method 900 is described with respect to the function block editor 126 shown in FIGS. 3 through 8C operating in the process control system 100 of FIG. 1. The method 900 could be used by any other suitable editor or device and in any other suitable system.

The function block editor 126 receives a request to create a new type of function block at step 902. This may include, for example, a user using the menu system 200 to request creation of a new Foundation Fieldbus function block type, a new custom data block type, or a new custom algorithm block type. As part of this step, the function block editor 126 may receive information identifying a name of the new function block type or an identification of the Foundation Fieldbus device associated with a new Foundation Fieldbus function block type.

The function block editor 126 generates a new definition file 120 for the new type of function block at step 904. This may include, for example, the function block editor 126 generating a definition file 120 for a new Foundation Fieldbus function block type, where the definition file 120 includes standard and vendor parameters, a form layout (with parameter ordering based on a template builder), and methods for the identified Foundation Fieldbus device. This may also include the function block editor 126 generating a definition file 120 for a new custom data block type or custom algorithm block type, where the definition file 120 includes the fixed parameters for the block type. This may further include the function block editor 126 assigning default values to various attributes of these parameters.

The function block editor 126 provides one or more forms that allow the user to enter or edit parameters and parameter attributes for the new type of function block at step 906. This may include, for example, the function block editor 126 providing the user with forms to alter the default values assigned to the parameter attributes. This may also include the function block editor 126 providing the user with forms to create new custom parameters. This may further include the function block editor 126 providing the user with forms to define the form layout (using tabs, groups, and grids) and symbol (with input and output pins) of the new function block type. In addition, this may include the function block editor 126 providing the user with a form to control views in the other forms.

The parameter information is stored in the definition file 120 at step 908. This may include, for example, the function block editor 126 storing any new default values, custom parameters, form layout, symbol attributes, and view information in the definition file 120.

At this point, the definition file 120 of the new function block type is available for use in creating new function blocks for use in the process control system 100. As an example, the definition file 120 could be used to present the symbol and form layout to a user who is attempting to incorporate a new function block into a control process at step 910. This may include, for example, the process builder 124 providing the symbol of the new function block type to the user for use in linking inputs and outputs of the new function block to other function blocks. This may also include the process builder 124 providing the form layout of the new function block type to the user for use in configuring the new function block.

Although FIG. 9 illustrates one example of a method 900 for creating and editing function block types and their associated parameters in a process control system, various changes may be made to FIG. 9. For example, steps 902-904 may be skipped if a user is editing an already-existing function block type. In that case, the function block editor 126 may retrieve the information from an existing definition file 120, and the user may then edit this information.

In some embodiments, the functions of the function block editor 126 described in this disclosure are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
a memory configured to store information defining multiple function block types;
a function block editor configured to dynamically create or modify one or more of the function block types using input received through a graphical user interface, wherein the function block editor is configured to (i) define one or more parameters for a function block type being created or modified, (ii) create one or more new parameters for the function block type being created or modified, (iii) define and modify a form layout for the function block type being created or modified, and (iv) define a symbol representing the function block type being created or modified; and
a process builder configured to incorporate instances of one or more of the function block types into a control process and to provide the control process to a controller within a process control system, the process builder also configured to present at least one form to at least one user, each form associated with one of the function block types and based on the form layout for that function block type, each form allowing configuration of one of the instances of the function block types used in the control process;
wherein the function block editor is configured to receive, through the graphical user interface, information identifying a pin exposure permission for one or more of the parameters of the function block type being created or modified, and wherein each pin exposure permission defines whether the associated parameter is assigned to a pin of the symbol representing the function block type being created or modified.

2. The apparatus of claim 1, wherein the function block editor is further configured to group parameters for the function block type being created or modified, wherein at least some of the parameters are grouped into different categories of parameters.

3. The apparatus of claim 1, wherein the function block editor is configured to dynamically create or modify multiple function block types, the multiple function block types including: a Foundation Fieldbus-compatible function block type, a custom data block type comprising user-defined data parameters, and a custom algorithm block type comprising user-defined algorithms and user-defined data parameters.

4. The apparatus of claim 3, wherein the function block editor is configured to provide multiple second forms allowing the at least one user to dynamically create or modify the multiple function block types, wherein the second forms differ based on the function block types being created or modified.

5. The apparatus of claim 1, wherein the function block editor is further configured to define default values for attributes of the one or more parameters.

6. The apparatus of claim 1, wherein the function block editor is further configured to control which attributes of the one or more parameters are displayed in the graphical user interface.

7. The apparatus of claim 1, wherein:
the process control system is configured to control multiple pieces of industrial equipment in a manufacturing facility; and
the controller is configured to use the control process to control one or more pieces of the industrial equipment in the manufacturing facility.

8. The apparatus of claim 1, wherein the function block editor comprises a form layout editor for defining the form layout for the function block type being created or modified; and
further comprising a template builder configured to generate a template for at least one but not all of the function block types, the template defining a listing of parameters that is initially displayed by the form layout editor.

9. The apparatus of claim 1, wherein the function block editor is further configured to present the at least one user with a list of methods that are available for use in the function block type being created or modified and receiving a selection of at least one of the methods from the at least one user, wherein the list of methods is based on a device associated with the function block type being created or modified.

10. The apparatus of claim 1, wherein the function block editor is configured to provide the at least one user with one or more attributes associated with each of the parameters; and further comprising a view manager configured to use one or more views to configure which parameter attributes are displayed to the at least one user.

11. The apparatus of claim 10, wherein:
a first view is defined in a definition file associated with the function block type being created or modified, the first view being available to multiple users accessing the definition file; and
a second view is associated with a particular user and is available only to that particular user.

12. A system, comprising:
a controller configured to control one or more process elements in a facility; and
an apparatus comprising:
a memory configured to store information defining multiple function block types;
a function block editor configured to dynamically create or modify one or more of the function block types using input received through a graphical user interface, wherein the function block editor is configured to (i) define one or more parameters for a function block type being created or modified, (ii) create one or more new parameters for the function block type being created or modified, (iii) define and modify a form layout for the function block type being created or modified, and (iv) define a symbol representing the function block type being created or modified; and
a process builder configured to incorporate instances of one or more of the function block types into a control process and to provide the control process to the controller, the process builder also configured to present at least one form to at least one user, each form associated with one of the function block types and based on the form layout for that function block type, each form allowing configuration of one of the instances of the function block types used in the control process;
wherein the function block editor is configured to receive, through the graphical user interface, information identifying a pin exposure permission for one or more of the parameters of the function block type being created or modified, and wherein each pin exposure permission defines whether the associated parameter is assigned to a pin of the symbol representing the function block type being created or modified.

13. The system of claim 12, wherein the function block editor is further configured to group parameters for the function block type being created or modified, wherein at least some of the parameters are grouped into different categories of parameters.

14. The system of claim 12, wherein the function block editor is configured to dynamically create or modify multiple function block types, the multiple function block types including: a Foundation Fieldbus-compatible function block type, a custom data block type comprising user-defined data parameters, and a custom algorithm block type comprising user-defined algorithms and user-defined data parameters.

15. The system of claim 12, wherein the function block editor is further configured to control which attributes of the one or more parameters are displayed in the graphical user interface.

16. A method, comprising:
receiving information through a graphical user interface, the information associated with one or more function block types;
dynamically creating or modifying one or more of the function block types based on the information, wherein dynamically creating or modifying one of the function block types includes (i) defining one or more parameters for the function block type being created or modified, (ii) creating one or more new parameters for the function block type being created or modified, (iii) defining and modifying a form layout for the function block type being created or modified, and (iv) defining a symbol representing the function block type being created or modified;
receiving, through the graphical user interface, information identifying a pin exposure permission for one or more of the parameters of the function block type being created or modified, wherein each pin exposure permission defines whether the associated parameter is assigned to a pin of the symbol representing the function block type being created or modified;
incorporating instances of one or more of the function block types into a control process;
presenting at least one form to at least one user, each form associated with one of the function block types and based on the form layout for that function block type, each form allowing configuration of one of the instances of the function block types used in the control process; and
providing the control process to a controller within a process control system.

17. The method of claim 16, further comprising:
receiving information grouping parameters of the one or more created or modified function block types, at least some of the parameters grouped into different categories of parameters.

18. The method of claim 16, further comprising:
receiving information controlling which attributes of the one or more parameters are displayed in the graphical user interface.

* * * * *